United States Patent
Sasai et al.

[19]

[11] Patent Number: 6,102,506
[45] Date of Patent: *Aug. 15, 2000

[54] RECORDING APPARATUS

[75] Inventors: Keizo Sasai, Yokohama; Akio Okubo, Tokyo; Atsushi Saito, Yokohama; Yasuhiko Ikeda, Sagamihara; Shigeyuki Sugiyama, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/626,686

[22] Filed: Apr. 2, 1996

Related U.S. Application Data

[63] Continuation of application No. 08/170,891, Dec. 21, 1993, abandoned.

[30] Foreign Application Priority Data

Dec. 22, 1992 [JP] Japan ................................. 4-356552
Jan. 20, 1993 [JP] Japan ................................. 5-023538

[51] Int. Cl.$^7$ ............................................. B41J 3/00
[52] U.S. Cl. ................................. 347/3; 347/104
[58] Field of Search ............................... 347/3, 104, 108; 358/498, 496, 296, 502

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,475,128 | 10/1984 | Koumura ................................. 347/3 |
| 4,558,333 | 12/1985 | Sugitani et al. . |
| 4,608,577 | 8/1986 | Hori . |
| 4,698,650 | 10/1987 | Watanabe ........................... 347/108 X |
| 4,723,129 | 2/1988 | Endo et al. . |
| 4,740,796 | 4/1988 | Endo et al. . |
| 4,893,137 | 1/1990 | Ebinuma ............................. 347/108 X |
| 4,969,048 | 12/1990 | Hoshino .................................. 358/296 |
| 5,025,326 | 6/1991 | Shimmyo ................................ 358/498 |
| 5,055,861 | 10/1991 | Murayama ......................... 347/102 X |
| 5,138,463 | 8/1992 | Morimoto .......................... 358/496 X |
| 5,172,238 | 12/1992 | Kuboki .............................. 347/104 X |
| 5,206,666 | 4/1993 | Watanabe .................................. 347/3 |
| 5,249,062 | 9/1993 | Eviri ..................................... 347/3 X |
| 5,321,467 | 6/1994 | Tanaka .................................. 347/3 X |
| 5,329,373 | 7/1994 | Hayashi ................................ 347/3 X |
| 5,359,435 | 10/1994 | Hayashi ................................ 347/3 X |

FOREIGN PATENT DOCUMENTS

| | | | |
|---|---|---|---|
| 0271090 | 6/1988 | European Pat. Off. | ........... B41J 3/04 |
| 0297566 | 1/1989 | European Pat. Off. | ......... H04N 1/00 |
| 0389285 | 9/1990 | European Pat. Off. | ......... H04N 1/00 |
| 54-56847 | 5/1979 | Japan . | |
| 59-123670 | 7/1984 | Japan . | |
| 59-138461 | 8/1984 | Japan . | |
| 60-71260 | 4/1985 | Japan . | |

*Primary Examiner*—John Barlow
*Assistant Examiner*—Craig Hallacher
*Attorney, Agent, or Firm*—Fitzpatrick, Cella, Harper & Scinto

[57] ABSTRACT

The present invention provides a recording apparatus comprising recording means for forming an image on a sheet, discharge means for discharging the sheet on which the image was formed by the recording means, and an outer cover for convering a body of the recording apparatus. Wherein a deep recess is formed in a side wall portion of the cover, and the discharge means is arranged in a deep area of the recess, and the sheets discharged by the discharge means are stacked on a bottom surface of the recess. Whereby, the visual observation of the discharged sheet can be made more easy, the removal of the jammed sheet can be facilitated, and the recording means can easily be exchanged.

21 Claims, 25 Drawing Sheets

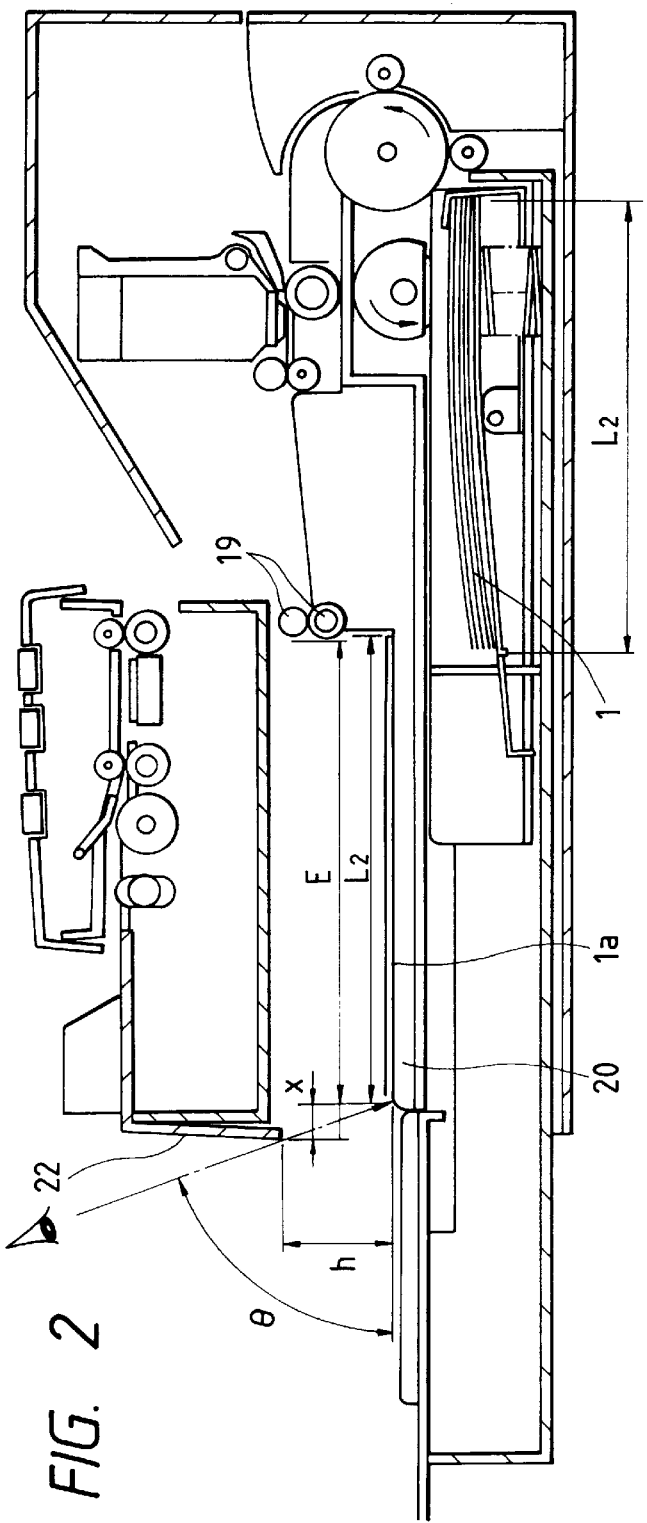
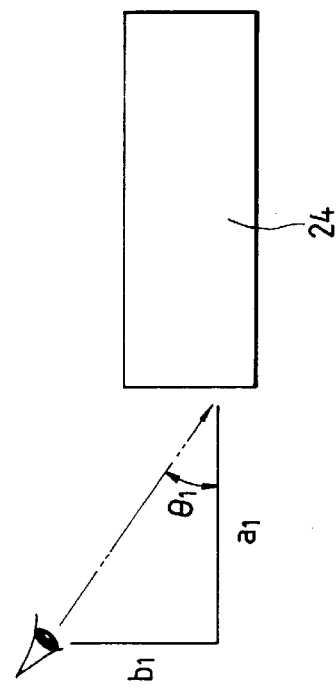
FIG. 2
FIG. 3

RECORDING APPARATUS

This application is a continuation of application Ser. No. 08/170,891, filed Dec. 21, 1993, now abandoned.

BACKGROUND OF THE INVENTION

1. Field of the Invention

The present invention relates to a recording apparatus such as a copying machine, a printer and the like, and a sheet convey apparatus used with such recording apparatus.

2. Related Background Art

An example of a conventional copying machine is shown in FIG. 19. In this copying machine, a plurality of recording sheets 551 are stacked in a cassette 552 which is removably mounted to a body 553 of the copying machine. The machine body 553 is provided with a sheet supply roller 554 for feeding out the recording sheet 551, a pair of guide 555, 556, a recording portion 557, and a pair of sheet discharge rollers 558. The pair of guides 555, 556 are arranged in an opposed relation to constitute a convey path for the recording sheet 551. The pair of discharge rollers 558 are arranged in the proximity of an outer cover of the machine body 553, and a tray 559 is arranged below and in the proximity of the paired discharge rollers 558. The tray has a length substantially same as a maximum length (Li in FIG. 19) of the recording sheet 551 contained in the cassette 552.

In a recording operation, the recording sheet 551 is fed out from the cassette 552, and an image is formed on the recording sheet at the recording portion 557, and then the recording sheet is discharged onto the tray 559 disposed outside the machine by the pair of discharge rollers 558.

In the above-mentioned conventional copying machine, since the pair of discharge rollers 558 are arranged in the proximity of the outer cover of the machine body 553, the tray 559 is protruded from the copying machine. Thus, even if the copying machine is made small-sized, since the tray is protruded from the machine, the substantial installation space for the copying machine will be increased by the length (Ll) of the tray. Further, since the discharge recording sheets are left on the tray (out of the machine) as they are, the sheets may be dropped from the tray by the air wind from an air conditioner or the imaged contents of the copies may be stolen by other persons or, when ink is used in the recording portion, the image on the copy may be deteriorated by the next discharged copy.

Another example of a conventional copying machine is shown in FIG. 20. In this copying machine, a plurality of recording sheets 600 are stacked in a cassette 601 which is removably mounted to a body 602 of the copying machine. Within the machine body 602, there are arranged a sheet supply roller 603 for feeding out the recording sheet 600, a pair of guides 604, 605, a recording portion 606, and a pair of sheet discharge rollers 607. The pair of guides 604, 605 are arranged in an opposed relation to constitute a convey path for the recording sheet 600.

The pair of discharge rollers 607 are arranged in the proximity of a discharge port 608 of the machine body 602, and a tray 609 is arranged below and in the proximity of the paired discharge rollers 558 and outside the copying machine. A protruded amount of the tray 609 is substantially the same as a maximum length (A in FIG. 20) of the recording sheet 600 contained in the cassette 601.

In a recording operation, the recording sheet 600 is fed out from the cassette 601, and an image is formed on the recording sheet at the recording portion 606, and then the recording sheet is discharged onto the tray 609 disposed outside the machine by the pair of discharge rollers 607. However, since the tray is protruded outwardly from the copying machine, the tray is a hindrance to an operator, and since the sheets may be dropped from the tray by the air wind, copying machines wherein a tray is arranged within a body of the machine have been proposed. When the tray is arranged within the machine body, since the operator cannot check whether the recording sheets are correctly discharged onto the tray or not, if the recording sheets are discharged out of the tray, the operator is not aware of such abnormity.

A further example of a conventional copying machine is shown in FIG. 21. In this copying machine, a plurality of recording sheets 751 are stacked in a cassette 752 which is removably mounted in an opening portion 753a of a body 753 of the copying machine. The machine body 753 is provided with a sheet supply roller 754 for feeding out the recording sheet 751, a pair of guides 755, 756, a recording portion 757, and a pair of sheet discharge rollers 758. The pair of guides 755, 756 are arranged in an opposed relation to constitute a convey path for the recording sheet 751. Further, the machine body 753 is divided into two parts one of which (753b) can be opened.

In a recording operation, the recording sheet 751 is positioned at a convey position 759a in the cassette 752, and, when the recording operation is started the recording sheet is conveyed in a direction shown by the arrow by the sheet supply roller 754, and is U-turned at a convey position 759b defined by the guides 755, 756, and then is sent, through a convey position 759c formed above the cassette 752, to the recording portion 757, where an image is formed on the recording sheet, and then the recording sheet is discharged out of the copying machine by the pair of discharge rollers 758.

When the sheet jam treatment is effected, the cassette 752 is firstly retracted toward the left (in FIG. 21), and then the jammed recording sheet 751 is removed after the body part 753b is opened. However, since the recording sheet convey path is disposed above the cassette, it is difficult to perform the sheet jam treatment. That is to say, if the sheet is jammed, the sheet will remain in the convey position 759a, 759b or 759c. If the sheet is jammed in the convey position 759b or 759c, the jammed sheet can be removed after the body part 753b and the guide 756 defining an upper wall of the convey position 759c are opened. However, if the sheet is jammed in the convey position 759a, it is very difficult to remove the jammed sheet, because, when the cassette 752 is retracted, the uppermost recording sheet is caught by the sheet supply roller 754 so that the uppermost sheet comes out the cassette to be left in the convey position 759a. Further, in the normal sheet supplying operation, the poor sheet supply condition often occurs due to the slip between the recording sheet 751 and the sheet supply roller 754, thereby remaining the recording sheet 751 in the convey position 759a.

In such cases, even when the cassette 752 is retracted, the remaining recording sheet cannot be removed. The reason is that, in order to make the machine small-sized, since the opening portion 753a only has a space required for mounting and dismounting the cassette, the operator cannot insert his hand in the opening portion to remove the jammed recording sheet.

In particular, recently, in order to make the machine small-sized, the copying machines have been designed so that the cassette 752 is contained in the machine body 753. In such copying machines, if the recording sheet is jammed or if the sheet is jammed when recording sheets of small size are contained in a universal cassette capable of accommodating various sizes of sheets, since the convey position 759a is positioned deeper in the machine body, the removal of the jammed recording sheet will be further difficult.

Further, since the guide 755 is integrally formed with the machine body 753 to reduce the number of parts, even when the part body 753a and the guide 756 are opened, the operator cannot see the recording sheet in the convey position 759a, thus making the removal of the jammed sheet difficult. In this case, the operator cannot ascertain whether the sheet is jammed or not, and, accordingly, if the cassette is inserted again while the sheet is being jammed, the serious trouble will occur.

The other example of a conventional copying machine is shown in FIGS. 22 and 23. In FIGS. 22 and 23, first of all, a recording portion will be explained. A plurality of recording sheets 851 are stacked in a container case 852. The recording sheets are fed out by a convey roller 853 and are separated one by one by a separation member 854. The separated recording sheet is conveyed in a direction shown by the arrow a. Then, the recording sheet 851 is guided by the convey rollers 853 and a recording guide 855 to be sent to a recording portion while being reversed or turned up.

A carriage 857 is shifted in a direction perpendicular to the plane of FIG. 23 along a guide 856. An ink cartridge 858 is removably mounted on the carriage 857 and serves to discharge ink to form an image on the recording sheet 851 in response to an image signal upon the reciprocal movement of the carriage 857. The ink cartirdge 858 integrally includes an ink discharge portion, an ink supply portion, an ink heating portion, and an ink tank.

As shown in FIG. 25, recording sheet side guides 859 are pivotally supported for rotational movements in directions shown by the arrows d, respectively, so that the recording sheet 851 on which the image was formed is conveyed in a direction shown by the arrow b while being supported at both lateral edges. This is the reason that the ink droplets discharged from the ink cartridge 858 on the recording sheet 851 are not immediately solidified on the recording sheet, and if the non-solidified ink droplets are rubbed by a tip end 851a of the recording sheet 851, the quality of the image will be worsened. Thus, the tip end 851a of the recording sheet on which the image is being formed is guided by the side guides 859 so that the image formed on the recording sheet 851 is not rubbed by the tip end of the next recording sheet. When the image forming operation is finished, as shown in FIG. 26, the recording sheet side guides 859 are rotated in the directions shown by the arrows d, and the sheets are stacked on the recording sheet stack 851 already rested on a recording sheet discharge tray 860.

Next, a reading portion will be explained. In FIG. 23, one or more originals 861 to be read are rested on an original stacking tray 862, and lateral edges of the originals are positioned by original width guides 863, and the originals are inserted into the copying machine from this side (right in FIG. 23) to that side (left in FIG. 23). When a reading operation is started in response to the command from an operation panel 864 arranged on an upper surface of the machine body, a separation roller 865 is rotated in a direction shown by the arrow e, and the originals are separated one by one from the lowermost one by a separation member 866. The separated original 861 is sent to a reading portion by a pair of convey rollers 867, 868. In the reading portion, the original is set within the depth of focus of a reading sensor 870 by a sensor roller 869. The image data on the original is read by the sensor 870 by the photo-electric conversion technique. Then, the original is conveyed in a direction shown by the arrow c by a pair of discharge rollers 871, 872 to be discharged onto an original discharge tray 873.

Now, when the ink cartridge 858 is desired to be exchanged by a new one due to the poor ink discharge from the cartridge, such exchanging operation will be explained with reference to FIG. 24. First of all, the operator rotates a recording cover 874 on which the original stacking tray 862 and the original width guides 863 are provided around a hinge means 875, thereby inclining the cover toward this side of the machine. As a result, the upper portion of the recording portion of the copying machine is opened. In this condition, the ink cartridge is removed from the copying machine by picking up the cartridge from the above, and a new ink cartridge is inserted into the copying machine. Then, the recording cover 874 is rotated toward that side of the machine around the hinge means 875, thereby closing the recording portion.

However, in the above-mentioned conventional copying machine, as shown in FIG. 23, since a space shown as an area A above the recording sheet side guides must include a space required for accommodating a predetermined number of recording sheets 851 and a space sufficient to prevent the deterioration of the image while conveying the recording sheet on which the non-solidified ink droplets were discharged, the copying machine becomes large-sized.

Further, if the recording sheets 851 more than the predetermined number are stacked on the recording sheet discharge tray 860, the next sheet is likely to be jammed due to the presence of the discharged sheets (particularly, in a facsimile system which is being operated all night without no monitor, if a large amount of data are received, such sheet jam will frequently occur).

Further, after reading, when the originals 861 are remained on the original discharge tray 873 (particularly, in the facsimile system, the read originals 861 are often remained on the original discharge tray 873 for the memory transmission, timer transmission and the like), it is difficult for the operator to see the imaged surfaces of the recording sheets 851 discharged on the recording sheet discharge tray 860.

SUMMARY OF THE INVENTION

An object of the present invention is to reduce a protruded amount of a tray from an image forming apparatus.

Another object of the present invention is not only to reduce a protruded amount of a tray from an image forming apparatus but also to permit an operator to ascertain the fact that a sheet is discharged onto a sheet receiving portion from outside of the image forming apparatus.

A further object of the present invention is to easily find a recording sheet jammed in an image forming apparatus and to easily remove the found recording sheet.

The other object of the present invention is to eliminate the above-mentioned conventional drawbacks and to make an image forming apparatus small-sized while maintaining the high quality of an image.

BRIEF DESCRIPTION OF THE DRAWINGS

FIG. 2 is a sectional view for showing a positional relation between a tip end of a recording sheet (having a minimum length) discharged from the facsimile machine of FIG. 1 and an outer cover and discharge rollers;

FIG. 3 is a view for explaining an angle θ of the line of vision, associated with the first invention;

DETAILED DESCRIPTION OF THE PREFERRED EMBODIMENTS

Figure 1:
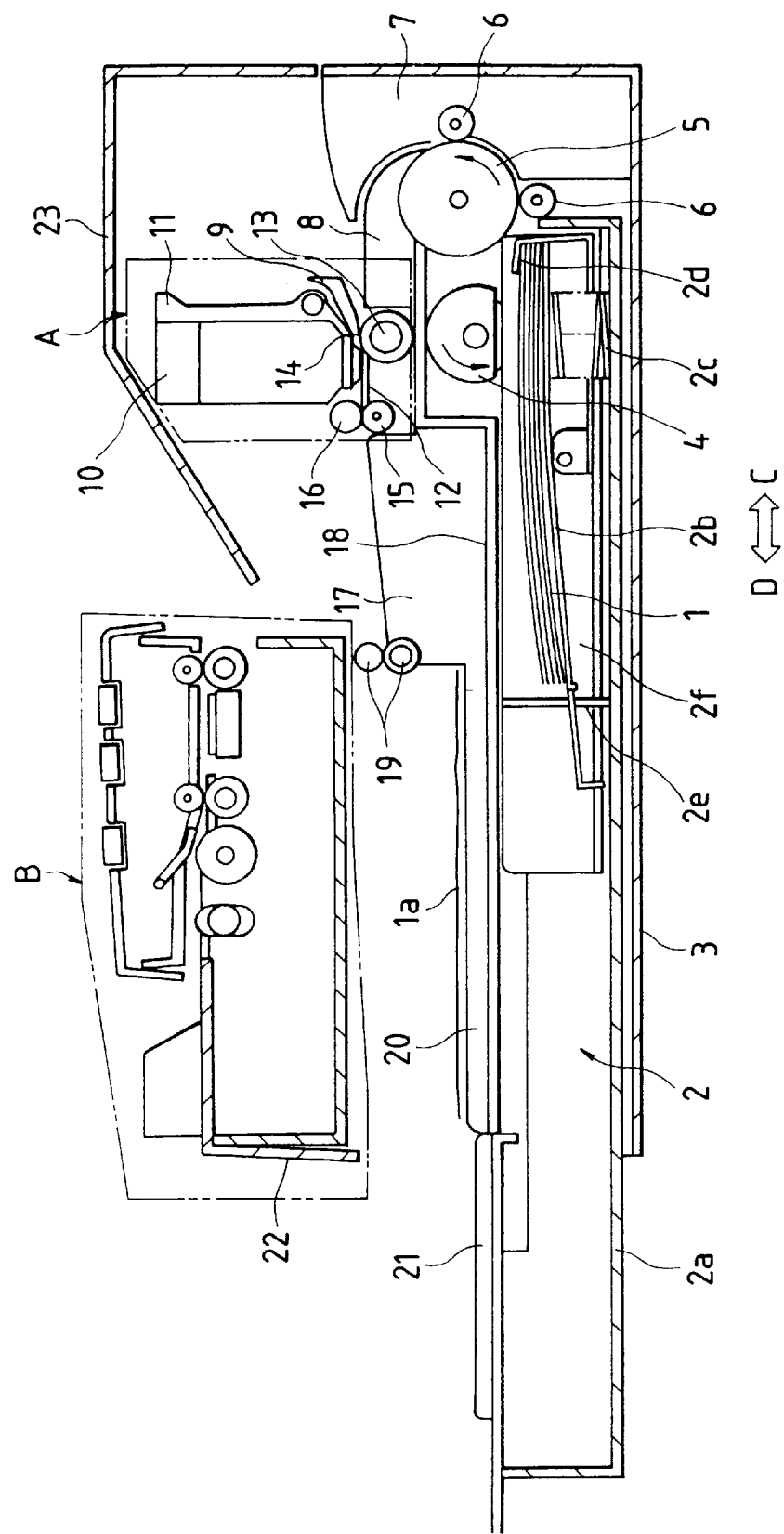
FIG. 1 is a sectional view of a facsimile machine to which a first invention is applied.

FIG. 1 is a sectional view showing the construction of a facsimile machine to which a first embodiment of a first invention is applied.

In FIG. 1, a plurality of recording sheets 1 are stacked in a cassette 2. The cassette 2 can be removably mounted to a body 3 of the facsimile machine and comprises a box-shaped trough 2a, an intermediate plate 2b constituting a bottom for supporting the recording sheets 1, a spring 2c for pushing up the intermediate plate 2b, a pawl 2d for catching tip ends of the recording sheets 1, and regulating plates 2e, 2f for regulating lengths and widths of the recording sheets 1.

The cassette 2 is a so-called universal type which can accommodate various sizes of recording sheets by shifting the regulating plates 2e, 2f, and, in the illustrated embodiment, four kinds of recording sheets having A4 lateral size (length of 148 mm), B4 lateral size (length of 182 mm), A4 longitudinal size (length of 297 mm), and B4 longitudinal size (length of 364 mm), respectively, can be accommodated in the cassette. (The aforementioned length is a length of the recording sheet in a convey direction of the recording sheet.)

A sheet supply roller 4 serves to feed out the recording sheets from the cassette and cooperates with the pawl 2d to separate the recording sheets one by one. A convey roller 5 cooperates with a counterroller 6 to pinch the recording sheet 1 separated by the sheet supply roller 4 therebetween. A reverse rotation guide 7 serves to reverse or turn up the recording sheet 1 in a U-turn manner. A pre-guide 8 is provided with a plurality of ribs and serves to constitute a convey 5 path for regulating a lower portion of the reversed recording sheet 1. An upper guide 9 is opposed to the pre-guide 8 and serves to constitute a convey path for regulating an upper portion of the recording sheet 1.

A recording portion (ink jet printer) A includes an ink jet cartridge 10 of disposable type comprising a recording head and an ink tank, a carriage 11 on which the ink jet cartridge 10 is mounted and which can be reciprocally shifted to effect the recording, and a platen 12 opposed to the ink jet cartridge 10 and having an image forming portion.

Further, there are arranged a feed roller 13 disposed at an upstream side of the ink jet cartridge 10 and adapted to convey the recording sheet 1, an urging roller 14 urged against the feed roller 13, a sheet discharge roller 15 disposed at a downstream side of the ink jet cartridge 10 and adapted to convey the recording sheet 1 toward a downstream side of the facsmile machine, and spurs 16 urged against the discharge roller 15 and made of material to which the image is not transferred even when the imaged surface of the recording sheet 1 is contacted with the spurs.

A post-guide 17 is provided with a plurality of ribs and serves to constitute a convey path for regulating a lower portion of the recording sheet 1 on which the image was formed at the recording portion A. A frame 18 forms a part of the body 3 of the facsimile machine and is arranged below the post-guide 17 and above the cassette 2. A pair of discharge rollers 19 serve to discharge the recording sheet 1 on which the image was formed onto sheet discharge ribs 20 and a sheet discharge tray 21 formed on the body 3 of the facsimile machine. The pair of discharge rollers 19 are positioned toward the interior of the facsimile machine body more than an outer cover 22.

The discharge tray 21 is constituted by a lid which can be removably attached to the cassette 2 and on which the discharged recording sheets 1a can be stacked. When an openable cover 23 is opened, a space required for exchanging the ink jet cartridge 10 is also opened and a space above the pre-guide 8 and the post-guide 17 is also opened.

Further, a reading system B serves to read image information on an original by a reading sensor. The recording portion A is not limited to the ink jet recording type, but may be of electrophotographic type, thermal-transfer type or other appropriate type. Further, the pair of discharge rollers 19 may be replaced by discharge belts or other appropriate member(s) which can discharge the recording sheet out of the facsimile machine.

Next, a recording operation of the facsimile machine will be explained. When a record start signal is sent from a control portion (not shown), the sheet supply roller 4 is rotated in an anti-clockwise direction in FIG. 1 to convey the recording sheet 1 from the cassette in a direction shown by the arrow C in FIG. 1. The recording sheet 1 is further conveyed by the convey roller 5 and is reversed by the U-turn guide 7 and then is further conveyed in a direction shown by the arrow D in FIG. 1 to reach the recording portion A. In the recording portion A, the image is formed on the recording sheet 1 by the ink jet cartridge 10 while being conveyed by the feed roller 13. Then, after the recording sheet is conveyed by the discharge roller 15, the recording sheet is discharged onto the discharge ribs 20 by the pair of discharge rollers 19.

Next, a positional relation between a tip end position of the discharged recording sheet 1 and the outer cover 22 and the pair of discharge rollers 19 will be fully explained with reference to FIG. 2. Now, it is assumed that a recording sheet of A4 lateral size (length of 148 mm) having the minimum length which can be accommodated in the cassette 2 is used as the recording sheet 1. L2 is a length of the recording sheet 1 and the discharged recording sheet 1a, E is a distance between an end face of the outer cover 22 and the pair of discharge rollers 19, and x is a distance between the end face of the outer cover 22 and a tip end of the discharged recording sheet 1a.

Further, h is an upper open height for the discharged recording sheets 1a, i.e., a distance between the discharge ribs 20 and the outer cover 22.

The upper open height for the discharged recording sheets 1a must be greater than a maximum height of the recording sheets 1a discharged and stacked. In the illustrated embodiment, since the maximum number of recording sheets (each having a thickness of 0.085 mm) contained in the cassette 2 is 200 (sheets), the height of the sheet stack becomes 17 mm (=200×0.085 mm). However, actually, in consideration of gaps between the recording sheets and the play for preventing the sheet jam, the upper open height h is selected to 40 mm.

Further, $\theta$ is an angle between the line of vision (shown by the two-dot and chain line) of the operator and a horizontal line and has an inherent value determined by the size and configuration of the facsimile machine. An example of the angle $\theta$ is shown in FIG. 3.

FIG. 3 shows the angle $\theta$ of the line of vision in a condition that the operator who sits down on a chair manipulates a facsimile machine having a telephone function and having a length of 300 mm, a width of 300 mm and a height of 100 mm installed on a desk. In FIG. 3, $a_1$ is a distance between the operator and the facsimile machine and $b_1$ is a height from the facsimile machine to the eyes of the operator. Accordingly, the angle $\theta$ of the line of vision becomes $\theta = \theta_1 = \tan^{-1}(b_1/a_1)$. Since $a_1$ is about 60 mm and $b_1$ is about 30 mm, the angle $\theta_1$ becomes about 27°. Similarly, in a condition that the operator who is standing manipulates a facsimile machine of desk-top type having a length of 400 mm, a width of 400 mm and a height of 200 mm installed in a desk, the angle $\theta$ of the line of vision becomes $\theta = \theta_2 = \tan^{-1}(b_2/a_2)$.

According to the general investigation, since $a_2$ is about 30 mm and $b_2$ is about 60 mm, the angle $\theta_2$ becomes about 63°. Generally, it is preferable to set the angle $\theta$ of the line of vision to 20 to 70°.

Returning to FIG. 2, the pair of discharge rollers 19 are positioned toward the interior of the body of the facsimile machine more than the outer cover 22 and are situated at a position which satisfies a relation $E > L_2$. Accordingly, the tip end of the discharged recording sheet 1a is positioned toward the interior of the body of the facsimile machine more than the end face of the outer cover 22 by a predetermined amount x. Therefore, a condition that the operator can surely ascertain the presence of the discharged recording sheet 1a by the aforementioned angle of the line of vision becomes as follows:

$$x \leq h/\tan \theta \qquad (1)$$

The results obtained by inputting the values of the angle $\theta$ of the line of vision to the above relation (1) are shown in Table 1.

TABLE 1

| $\theta$ | x (maximum value) |
| --- | --- |
| 20° | 110 mm |
| 27° | 79 mm |
| 63° | 20 mm |
| 70° | 15 mm |

As mentioned above, under the condition h=40 mm in the illustrated embodiment, it can be understood that the position of the pair of discharge rollers 19 may be positioned so that the tip end of the recording sheet 1a is positioned inside the outer cover 22 by preferably 110 mm or less.

As an example, when h=40 mm and $\theta$=45° are inputted to the above relaiton (1), $x \leq 40$ mm is obtained.

Since a relation $$E = L_2 + x \qquad (2)$$

is established, when $L_2$=148 mm and $x \leq -40$ mm are inputted to the above relation (2), the distance E between the end face of the outer cover 22 and the pair of discharge rollers 19 may be set within a range 148 mm $\leq$ E $\leq$ 188 mm, and, in the illustrated embodiment, the distance E is set to 150 mm.

Figure 4:
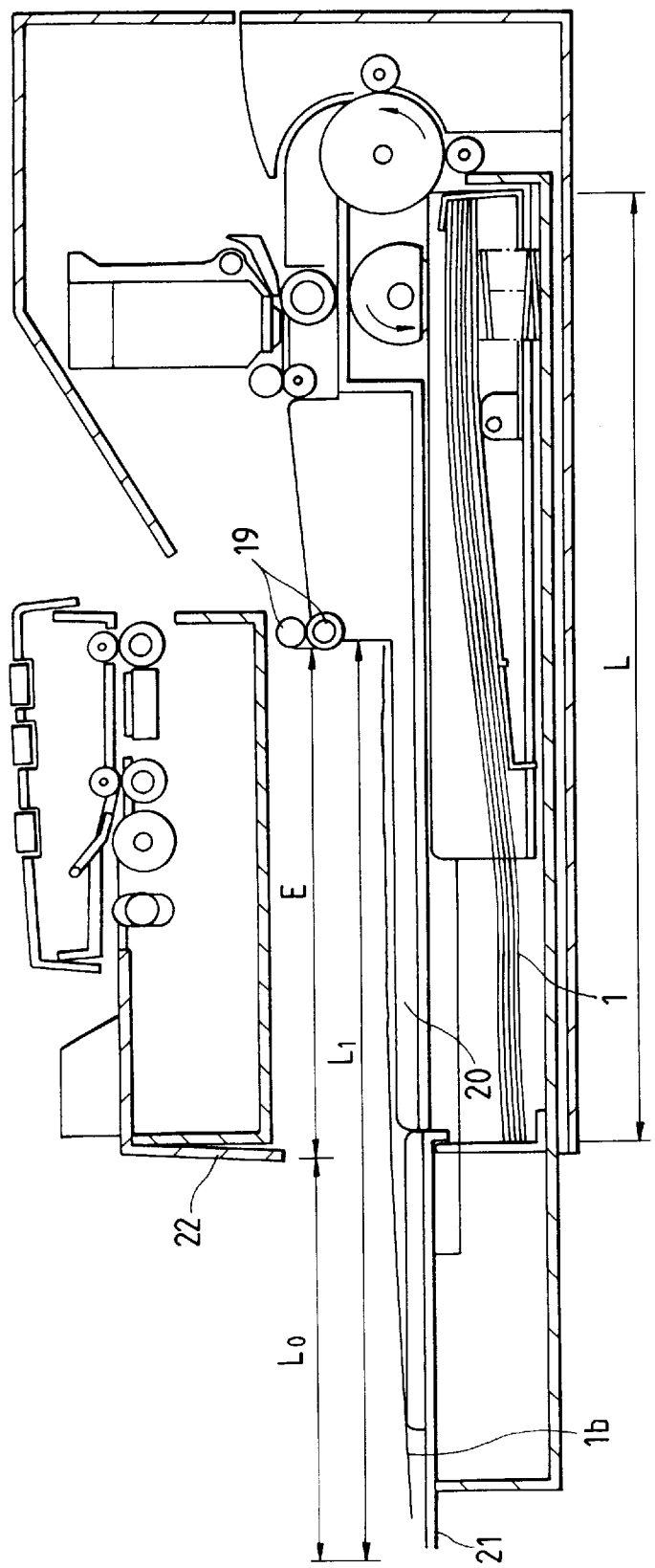
FIG. 4 is a sectional view for showing a positional relation between a tip end of a recording sheet (having a maximum length) discharged from the facsimile machine of FIG. 1 and an outer cover and discharge rollers.

Next, an example that a recording sheet of A4 longitudinal size (length of 364 mm) having a maximum length which can be accommodated in the cassette 2 is used as the recording sheet 1 will be explained with reference to FIG. 4. In FIG. 4, $L_1$ is a length of the recording sheet 1 and the discharged recording sheet 1b. Similar to the aforementioned example, after the image was formed on the recording sheet, the discharged recording sheets 1b are stacked on the discharge ribs 20 and the discharge tray 21.

Now, as mentioned above, since E=150 mm, a protruded amount $L_0$ of the recording sheet 1b protruded from the end face of the outer cover 22 becomes as follows:

$$L_0 = L_1 - E \qquad (3)$$

And, in this example, $L_0$ becomes 214 mm (=364−150). Accordingly, by designing the discharge tray 21 so that the protruded amount of the tray from the outer cover 22 becomes 214 mm, the whole length of the discharged recording sheet 1b can be supported by the discharge tray 21.

In the above embodiment, while the cassette 2 of universal type capable of accommodating various sizes of recording sheets was used, even when exclusive cassettes for respective sizes of recording sheets are prepared so that the desired cassette can be used, the above relations (1) to (3) may be satisfied. Further, when the recording sheet having the single length is used (for example, when the recording sheet having the minimum length is used), similarly, the above relations (1) to (3) may be satisfied. In this case, since the discharged recording sheets are not protruded from the outer cover 22, the discharge tray can be omitted.

Figure 5:
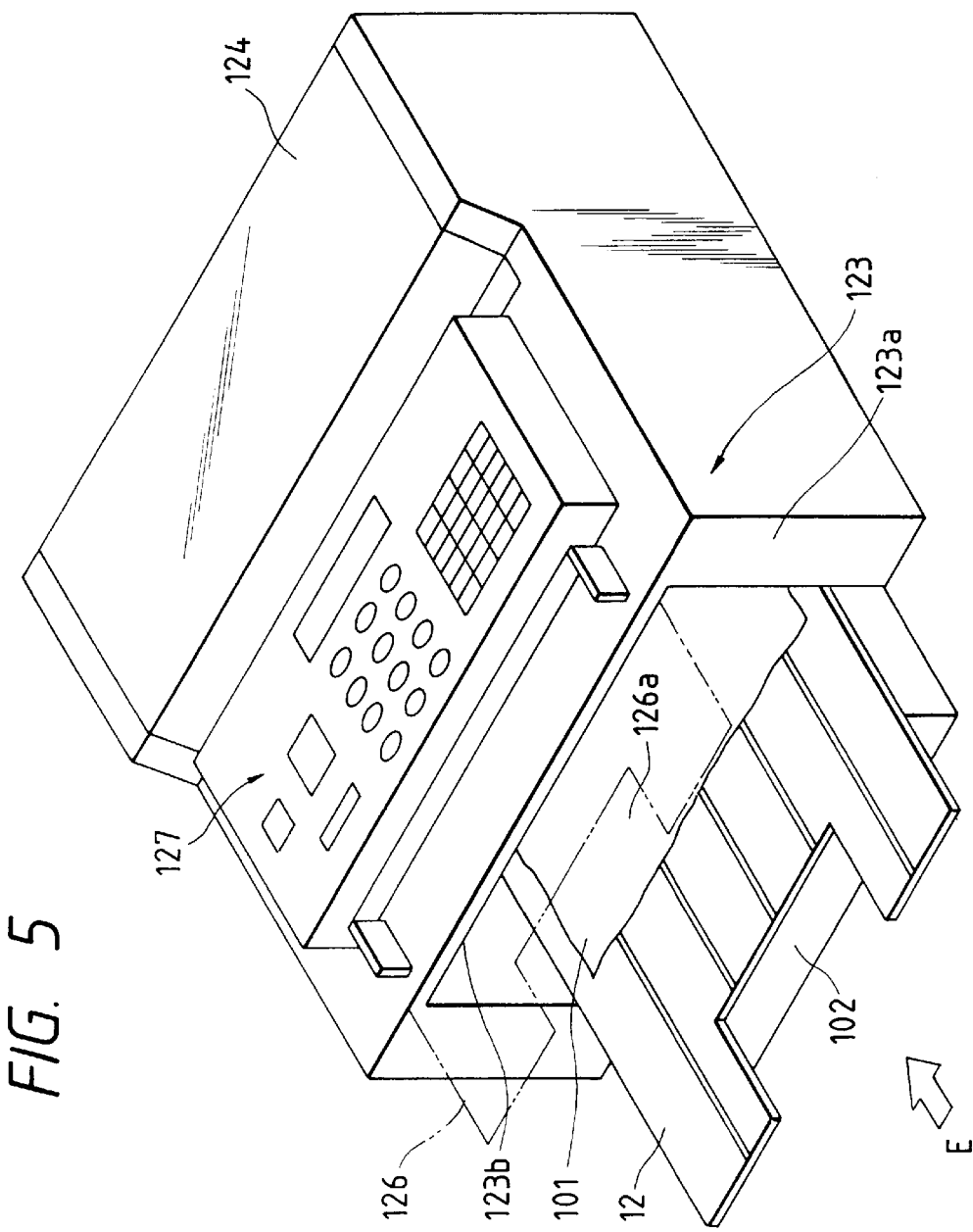
FIG. 5 is a perspective view of a facsimile machine according to a first embodiment of a second invention.
Figure 6:
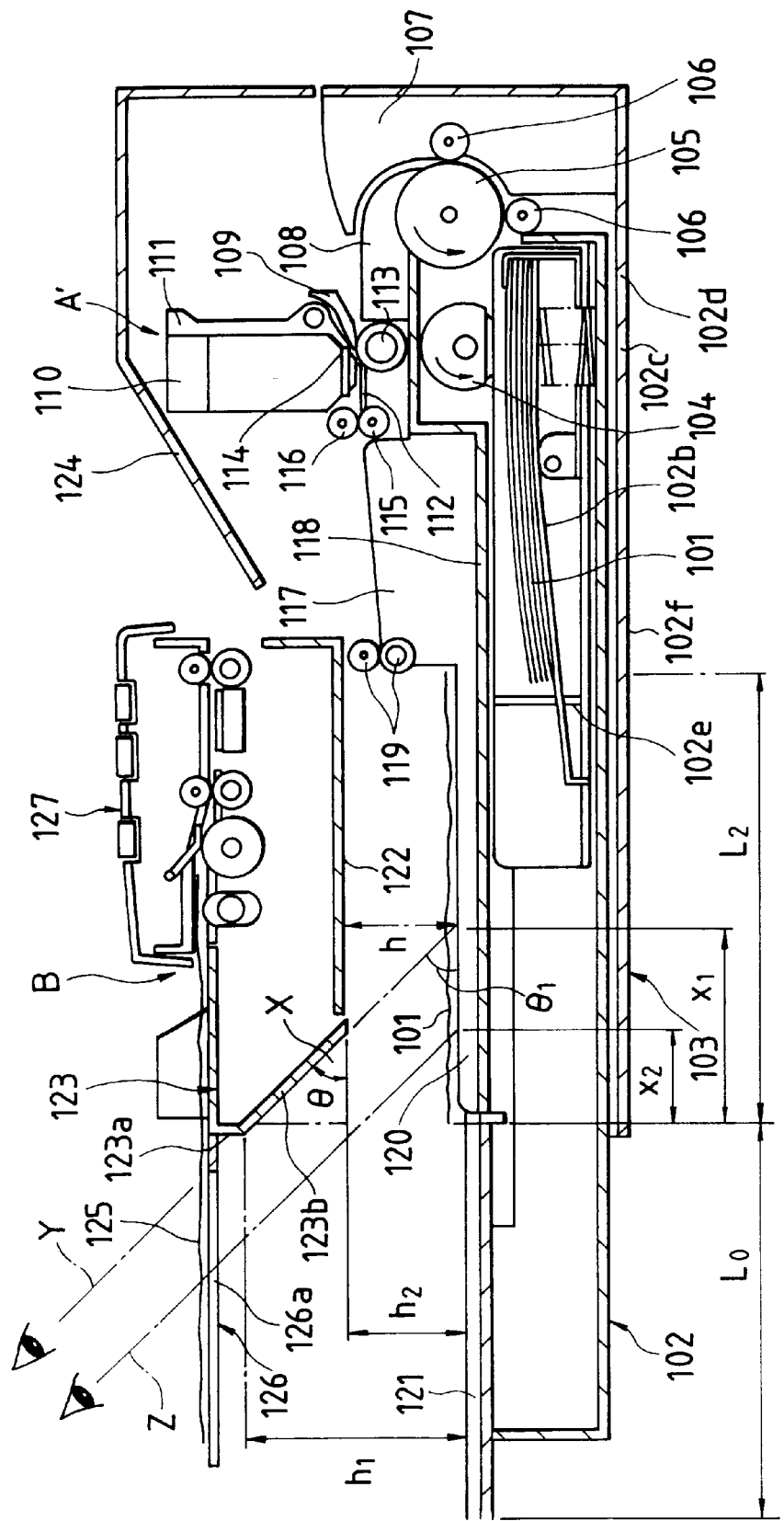
FIG. 6 is a sectional view of the facsimile machine of FIG. 5.

FIG. 5 is a perspective view of a facsimile machine to which a second invention of this application is applied, and FIG. 6 is a sectional view of the facsimile machine.

In this embodiment, a plurality of recording sheets 101 are stacked in a cassette 102. The cassette 102 can be removably mounted to a body 103 of the facsimile machine from a front side (in a direction shown by the arrow E) and comprises an intermediate plate 102b constituting a bottom for supporting the recording sheets 101, a spring 102c for pushing up the intermediate plate 102b, a pawl 102d for catching tip ends of the recording sheets 101, and regulating plates 102e, 102f for regulating length and widths of the recording sheets 101. The cassette 102 is a so-called universal type which can accommodate various sizes of recording sheets by shifting the regulating plates 102e, 102f, and, in the illustrated embodiment, four kinds of recording sheets having A4 lateral size (length of 148 mm), B4 lateral size (length of 182 mm), A4 longitudinal size (length of 297 mm), and B4 longitudinal size (length of 364 mm), respectively, can be accommodated in the cassette. The aforementioned length is a length of the recording sheet in a convey direction of the recording sheet.

A sheet supply roller 104 serves to feed out the recording sheets 101 from the cassette 102 and cooperates with the pawl 102d to separate the recording sheets 101 one by one. A convey roller 105 cooperates with a counter roller 106 to pinch the recording sheet 101 separated by the sheet supply roller 104 therebetween and to convey the recording sheet.

A reverse rotation guide 107 serves to reverse or turn up the recording sheet 101 in a U-turn manner. A pre-guide 108 is provided with a plurality of ribs and serves to constitute a convey path for regulating a lower portion of the reversed recording sheet 101.

An upper guide 109 is opposed to the pre-guide 108 and serves to constitute a convey path for regulating an upper portion of the recording sheet 101.

A recording portion (ink jet printer) A' includes an ink jet cartridge 110 of disposable type comprising a recording head and an ink tank, and a carriage 111 on which the ink jet cartridge 110 is mounted and which can be reciprocally shifted to effect the recording. Further, there are provided a platen 112 opposed to the ink jet cartridge 110 and having an image forming portion, and a feed roller 113 disposed at an upstream side of the ink jet cartridge 110 and adapted to convey the recording sheet 101.

Further, there are also arranged an urging roller 114 urged against the feed roller 113, a sheet discharge roller 115 disposed at a downstream side of the ink jet cartridge 110 and adapted to convey the recording sheet 101 toward a downstream side of the facsimile machine, and spurs 116 urged against the discharge roller 115 and made of material to which the image is not transferred even when the imaged surface of the recording sheet 101 is contacted with the spurs.

A post-guide 117 is provided with a plurality of ribs and serves to constitute a convey path for regulating a lower portion of the recording sheet 101 on which the image was formed at the recording portion A'. A frame 118 forms a part of the body 103 of the facsimile machine and is arranged below the post-guide 117 and above the cassette 102. A pair of discharge rollers 119 serve to discharge the recording sheet 101 on which the image was formed onto sheet discharge ribs 120 and a sheet discharge tray 121 formed on the body 103 of the facsimile. The discharge tray 21 is constituted by a lid which can be removably attached to the cassette 102 and on which the discharged recording sheets 101 can be stacked. A scanner frame 122 serves to form a part of the body 103 of the facsimile machine and to support a reading system B and is positioned above the discharge ribs 120.

Accordingly, the discharged recording sheets 101 are stacked in a space having a height h and enclosed by the discharge ribs 120 and the scanner frame 122. The height h must be greater than a maximum height of the recording sheets 101 discharged and stacked, and, in the illustrated embodiment, since the maximum number of recording sheets (each having a thickness of 0.085 mm) contained in the cassette 102 is 200 (sheets), the height h becomes 17 mm (=200×0.085 mm). However, actually, in consideration of gaps between the recording sheets 101 and the play for preventing the sheet jam, the height h is selected to 40 mm. The discharge tray 121 and the discharge ribs 120 constitute a receiving portion.

An outer cover 123 forms a part of the body 103 of the facsimile machine and has an end face 123a which is a front surface of the body 103 when looked at from a direction shown by the arrow E, and an inclined surface 123b disposed above the discharged recording sheets 101 and inclined with respect to a horizontal plane by a predetermined angle θ. It is desirable that the angle θ is the same as an angle $\theta_2$ of the line of vision of the operator (described later), and, in the illustrated embodiment, the angle θ is selected to 45°.

When a cover 124 for opening an upper portion of the body 103 is opened, a space required for exchanging the ink jet cartridge 110 is also opened and a space above the pre-guide 108 and the post-guide 117 is also opened. A reading system B attached to the outer cover 123 serves to read image information on an original 125 by a reading sensor. An original stacking tray 126 has a laid U-shaped configuration having a notched portion 126a to permit the observation of the discharged recording sheet 101 and is made of transparent material such as polyethylene and is attached to the outer cover 123. An operation panel 127 is provided on the outer cover 123, and the inclined surface 123b defines a window portion x.

Next, a recording operation of the facsimile machine having the above-mentioned construction will be explained. When a record start signal is sent from a control portion (not shown), the sheet supply roller 104 is rotated in a direction shown by the arrow in FIG. 6 to feed out the recording sheet 101 from the cassette 102. The recording sheet 101 is further conveyed by the convey roller 105 and is reversed by the U-turn guide 107 and then is further conveyed to reach the recording portion A'. In the recording portion A', the image is formed on the recording sheet 101 by the ink jet cartridge 110 while being conveyed by the feed roller 113. Then, after the recording sheet is conveyed by the discharge roller 115, the recording sheet is discahrged onto the discharge ribs 120 by the pair of discharge rollers 119.

Next, a positional relation between a tip end position of the discharged recording sheet 101 and the outer cover 123 and the pair of discharge rollers 119 will be fully explained.

The pair of discharge rollers 119 are positioned toward the interior of the body 103 of the facsimile machine more than the end face 123a of the outer cover and are situated at a position where the tip end (in a discharge direction) of the discharged recording sheet 101 is aligned with the end face 123a in the discharge direction. L2 is a length of the recording sheet 101 and the discharged recording sheet 101. Here, it is assumed that a recording sheet of A4 lateral size (length of 148 mm) having the minimum length which can be accommodated in the cassette 102 is used as the recording sheet 101. Further, $\theta_1$ is an angle between the line of vision (shown by the dot and chain line Y) of the operator who watches the discharged recording sheet 101 and a horizontal line and has an inherent value determined by the size and configuration of the facsimile. In general, the angle $\theta_1$ of the line of vision is in a range of 20 to 80°, and, in the illustrated embodiment, the angle $\theta_1$ is selected to 45°.

Further, $h_1$ is a height from the discharge ribs 120 to a connecting point between the end face 123a and the inclined surface 123b, and, in the illustrated embodiment, the height $h_1$ is selected to 80 mm. Further, $x_1$ is a length of a portion (from the tip end) of the discharged recording sheet 101 which can be watched by the operator. As apparent from FIG. 6, since $x_1 = h_1/\tan \theta_1$, the following result (4) can be obtained:

$$x_1 = 80/\tan 45° = 80 \text{ mm} \qquad (4)$$

Now, as the comparison, the case where the outer cover 123 has no inclined surface 123b and the end face 123a is extended vertically downwardly will be explained. In this case, the line of vision of the operator who watches the discharged recording sheet 101 becomes as shown by the dot and chain line Z.

Further, $h_2$ is a height from the discharge ribs 120 to a lower end of the inclined surface 123b and has substantially the same value as the above-mentioned value h, and, in the illustrated embodiment, the height $h_2$ is selected to 40 mm. Similarly, a length $x_1$ of a portion (from the tip end) of the discharged recording sheet 101 which can be watched by the operator becomes as follows:

$$x_2 = 40/\tan 45° = 40 \text{ mm} \qquad (5)$$

As apparent from the above equations (4) and (5), by providing the inclined or notched surface 123b on the outer cover 123, it is possible to increase the portion of the discharged recording sheet 101 which can be watched by the operator without changing the outer dimension of the facsimile machine and the recording sheet stacking height h, with the result that the operator can surely ascertain the discharge of the recording sheet 101.

As mentioned above, according to the present invention, the compactness of the image forming apparatus can be compatible with the sure observation of the discharged recording sheets. That is to say, since the discharge rollers are positioned toward the interior of the facsimile more than the outer cover and the outer cover has the notched surface, when the single kind of recording sheets are used the discharge tray can be omitted, and the completion of the recording can surely be ascertained since the operator can watch the discharged recording sheets.

Further, even when plural kinds of recording sheets having different lengths are used, it is possible to minimize the length of the discharge tray. For example, when two kinds of recording sheets having A4 lateral size (length of 148 mm) and B4 longitudinal size (length of 364 mm) are used, although the length $L_1$ of the discharge tray of 364 mm ($L_1 = 364$ mm) was required in the conventional facsimile machine, in the illustrated embodiment, the length $L_0$ of the discharge tray may be 216 mm.

In this way, since the protruded amount of the discharge tray from the facimile machine can be eliminated or reduced, it is possible to reduce the installation space for the facsimile machine and to obtain the simple design without no protrusion. Further, also in this case, the operator can surely watch the discharged recording sheet due to the presence of the notched surface of the outer cover, it is possible to prevent the discharged recording sheets from being left as they are.

Further, since the portions of the discharged recording sheets are stacked in the body of the facsimile machine, it is possible to prevent the secret leakage, the scattering of the sheets and the contamination of the sheets. Particularly, in a facsimile machine of ink jet recording type, although it takes a long time to solidify the ink discharged on the recording sheet, in the illustrated embodiment, since the distance between the discharge rollers and the outer cover is increased so that the ink can be solidified while the imaged recording sheet is being conveyed through this distance, it is possible to prevent the operator from touching the non-solidified image, thereby avoiding the deterioration of the image. Further, the present invention can be applied to copying machines, printers, as well as the facsimile machine.

Figure 7:
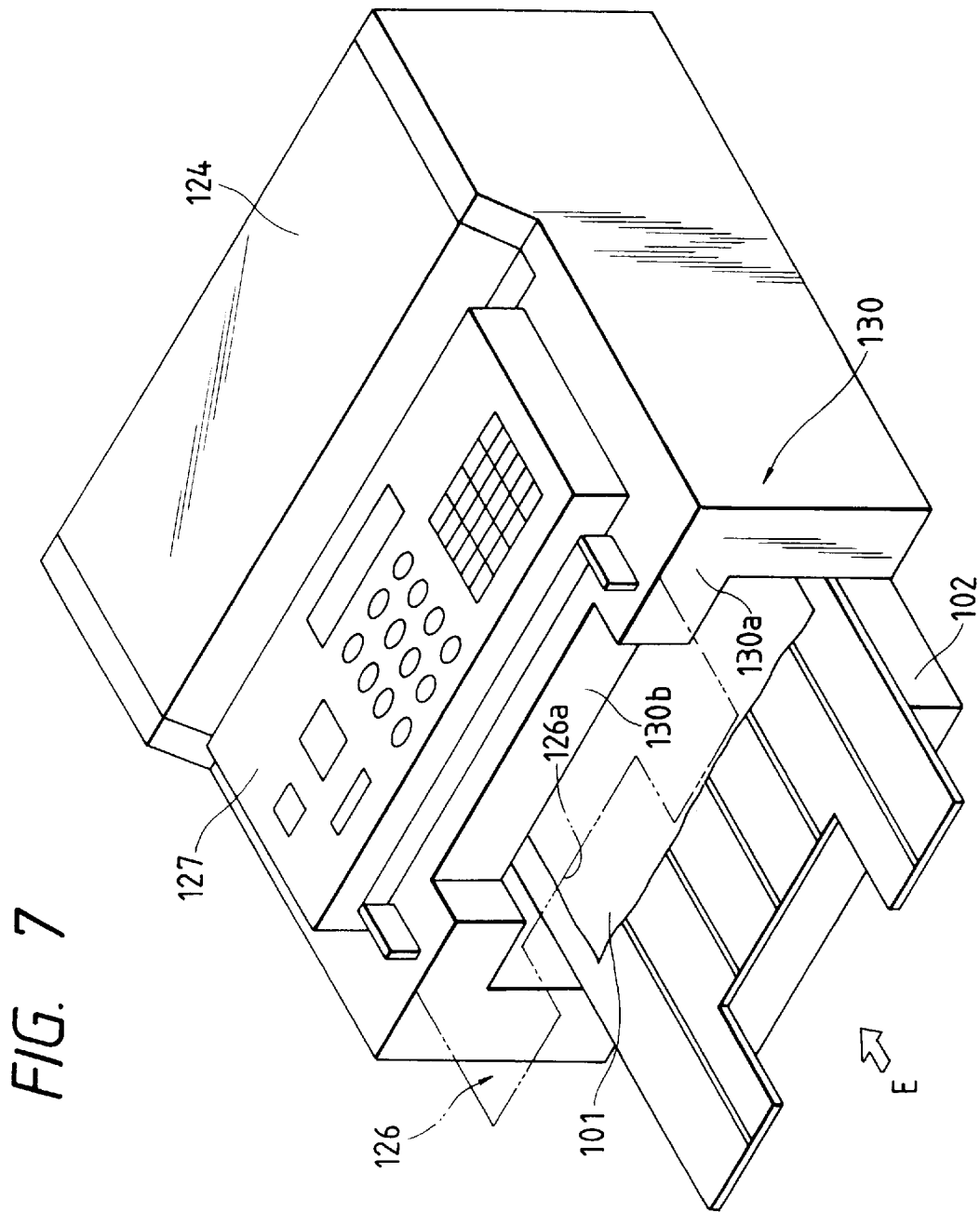
FIG. 7 is a perspective view of a facsimile machine according to a second embodiment of the second invention.
Figure 8:
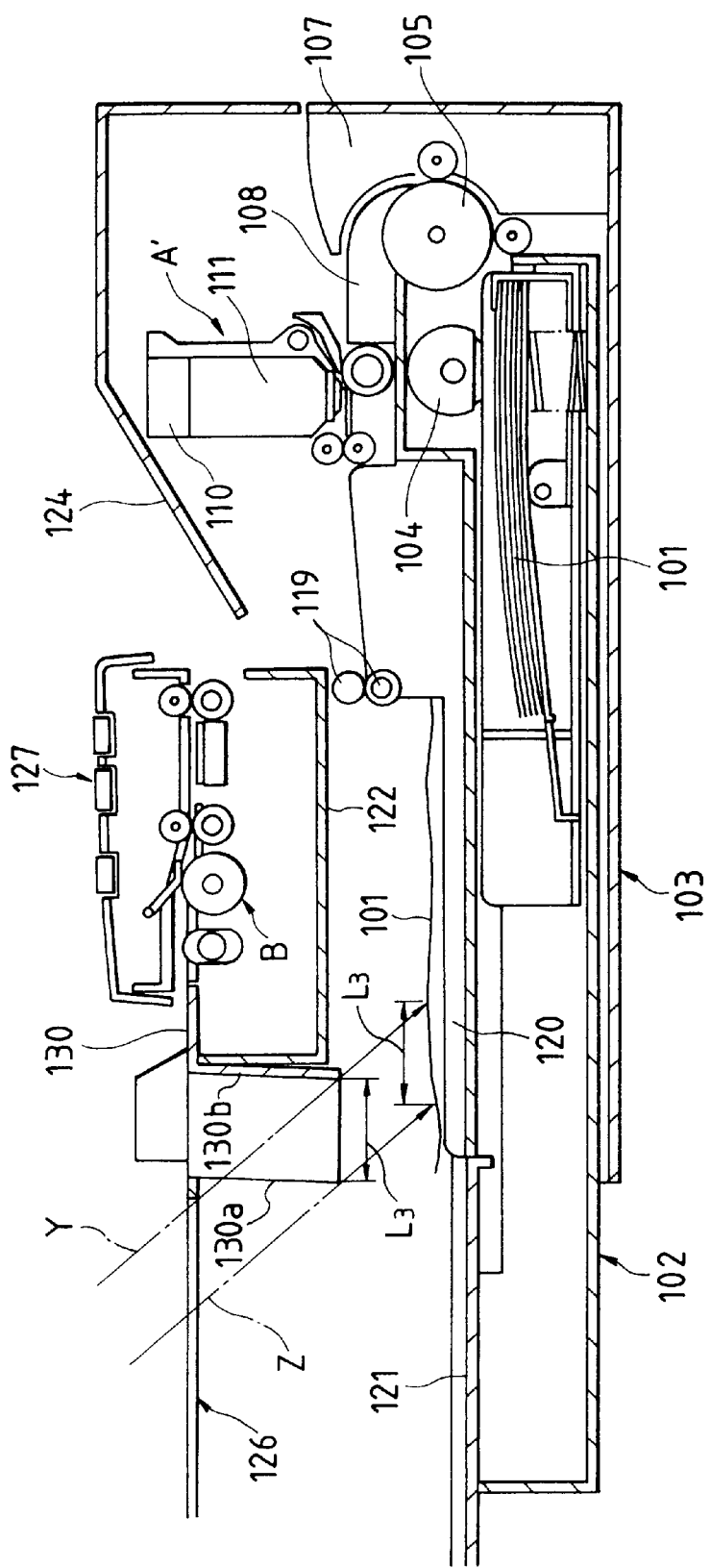
FIG. 8 is a sectional view of the facsimile machine of FIG. 7.

FIGS. 7 and 8 show a facsimile machine according to a second embodiment of the second invention.

In this facsimile machine, an outer cover 130 has an end face 130a which is a front surface of the facsimile machine when looked at from a front side of the facsimile machine (from a direction shown by the arrow E), and a notched surface 130b defining a bottom of a notch formed in a central portion of the end face 130a to facilitate the observation of the discharged recording sheet 101. In this embodiment, the notch has a U-shaped configuration and also has a depth $L_3$ (form the end face 130a).

Accordingly, a length of a portion of the discharged recording sheet 101 which can be looked at from the notched surface 130b can be longer than that looked at from the end face 130a by the distance $L_3$, thereby permitting the sure observation of the discharged recording sheets.

Figure 9:
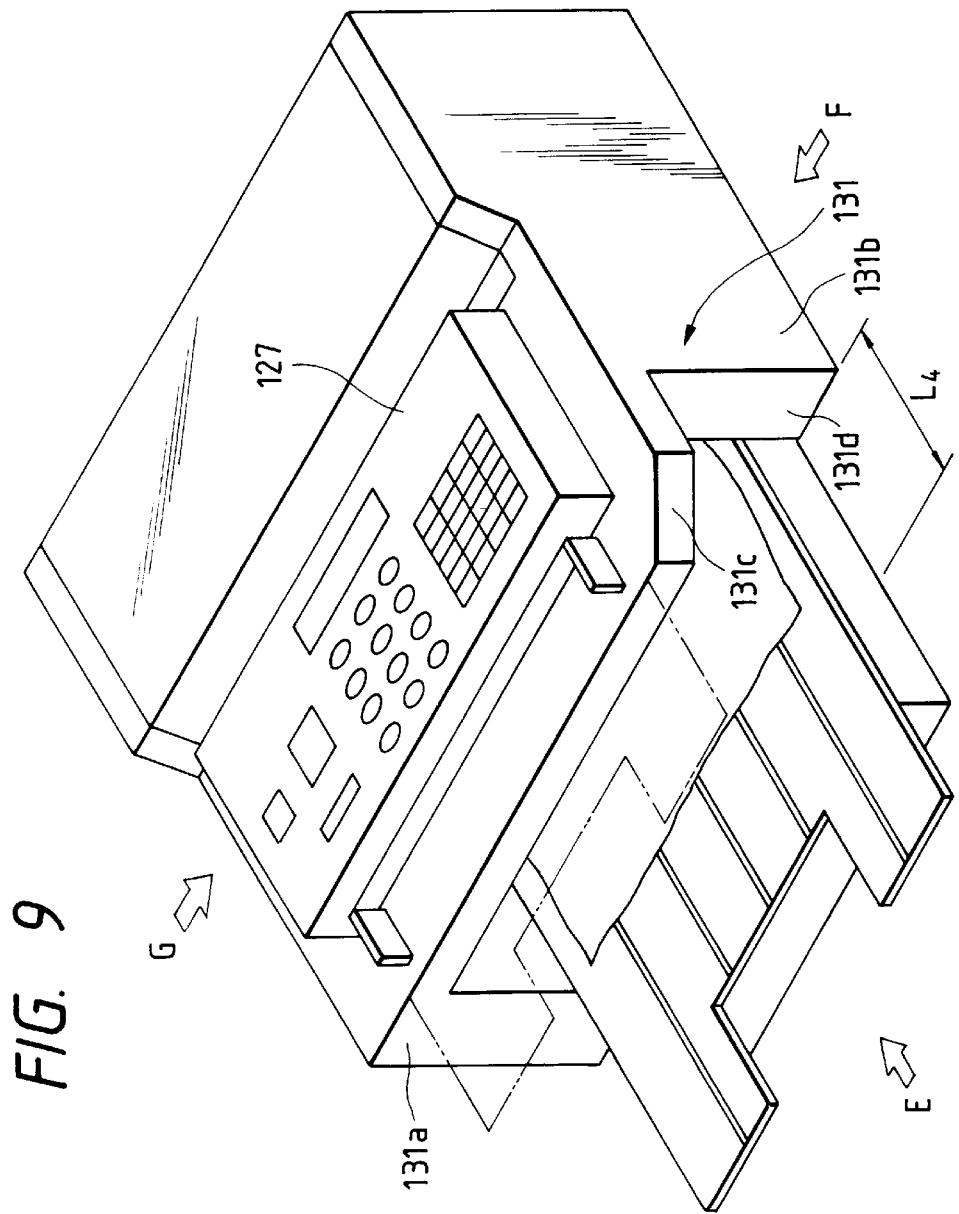
FIG. 9 is a perspective view of a facsimile machine according to a third embodiment of the second invention.

FIG. 9 shows a facsimile machine according to a third embodiment of the second invention.

In this embodiment, an outer cover 131 has an end face 131a which is a front surface of the facsimile machine when looked at from a direction shown by the arrow E, an end face 131b which is a side surface of the facsimile machine when looked at from a direction shown by the arrow F, a chamfered connection surface 131c connecting between the end faces 131a and 131b and obtained by chamfering a portion above the cassette 102, and a notched surface 131d for opening or releasing the side surface (near the arrow F) of the cassette 102, which notched surface is obtained by removing or notching a portion of the end face 131a disposed out of the cassette side near the arrow F by a distance $L_4$ toward the pair of discharge rollers 119.

Accordingly, a length of a portion (from the tip end) of the discharged recording sheet 101 which can be looked at from the direction F can be longer than that looked at from a direction G by the distance $L_4$, thereby permitting the sure observation of the discharged recording sheets. Thus, in this embodiment, it is preferable that the key arrangement and the like on the operation panel 127 is altered so that the operator can manipulate the facsimile machine from the direction F.

Figure 10:
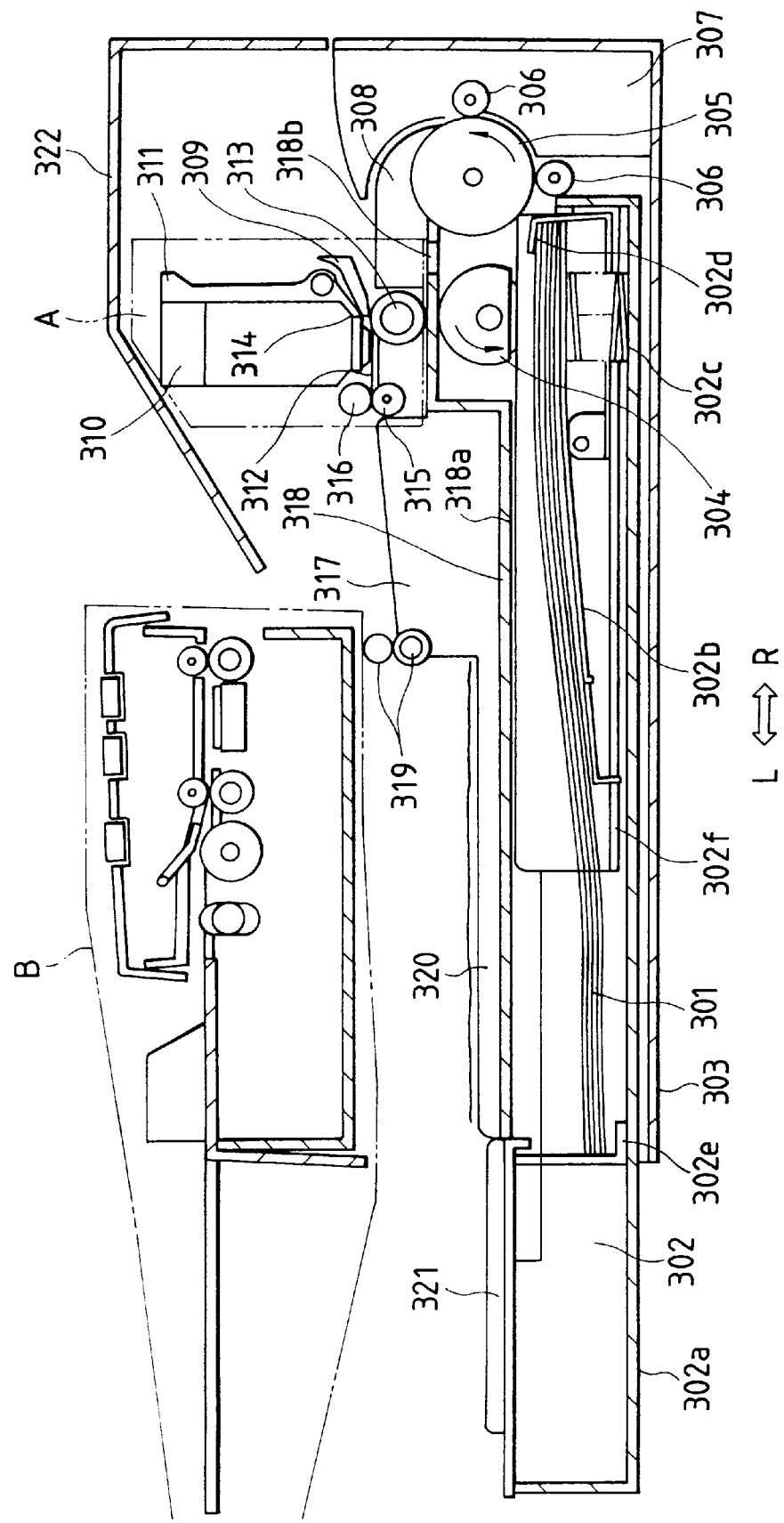
FIG. 10 is a sectional view of a facsimile machine according to a first embodiment of a third invention.
Figure 11:
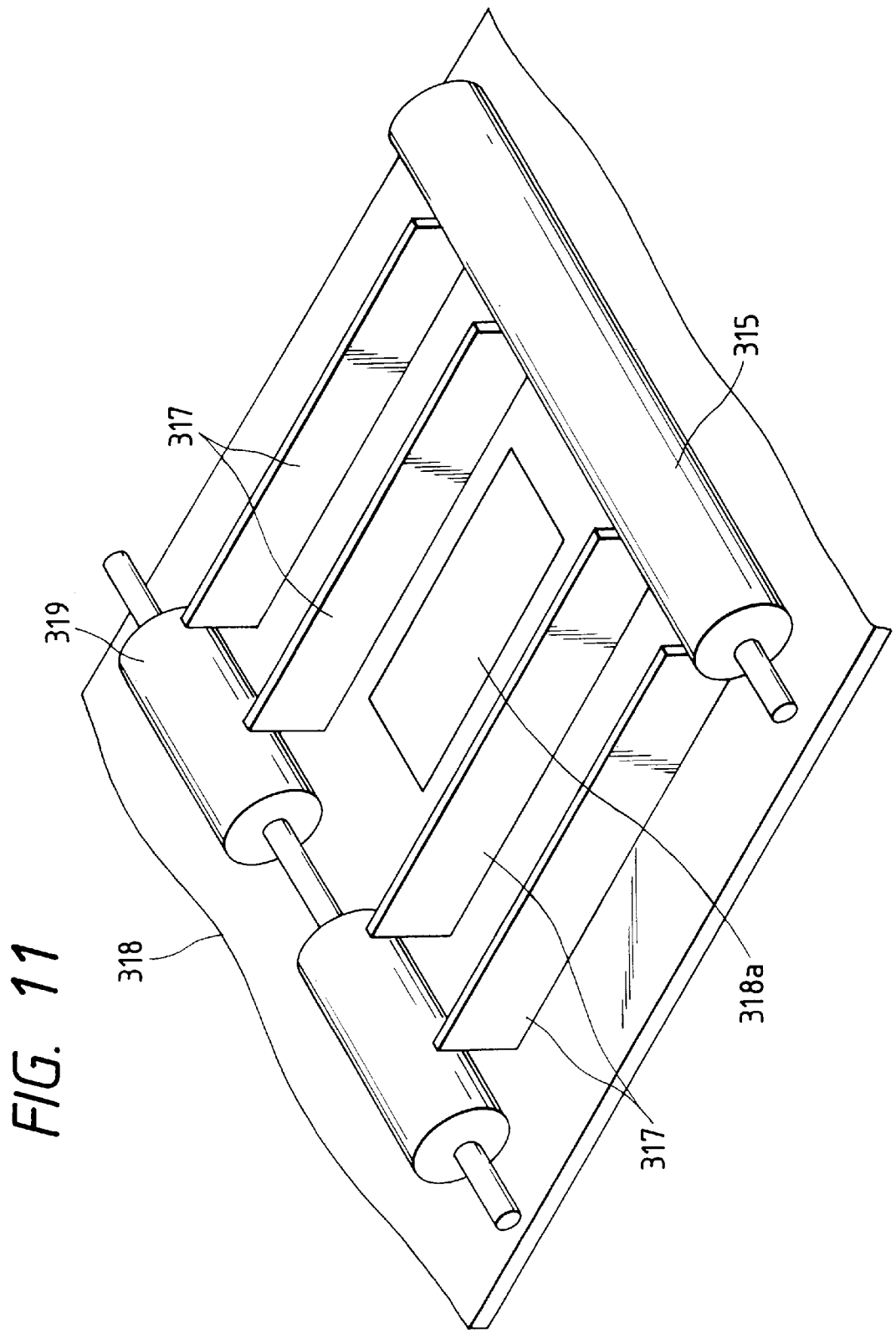
FIG. 11 is a partial perspective view of the facsimile machine of FIG. 10.

FIG. 10 is a sectional view of a facsimile machine to which a first embodiment of a third invention of this application is applied, and FIG. 11 is a perspective view of such facsimile machine.

A plurality of recording sheets 301 are stacked in a cassette 302. The cassette 302 can be removably mounted to a body 303 of the facsimile machine and comprises a box-shaped trough 302a, an intermediate plate 302b constituting a bottom for supporting the recording sheets, a spring 302c for pushing up the intermediate plate 302b, a pawl 302d for catching tip ends of the recording sheets 301, and regulating plates 302e, 302f for regulating lengths and widths of the recording sheets 301.

A sheet supply roller 304 serves to feed out the recording sheets 301 from the cassette 302 and cooperates with the pawl 302d to separate the recording sheets one by one. A convey roller 305 cooperates with a counterroller 306 to pinch the recording sheet 301 separated by the sheet supply roller 304 therebetween and to convey the recording sheet. A reverse rotation guide 307 serves to reverse or turn up the recording sheet 301 in a U-turn manner. A pre-guide 308 is provided with a plurality of ribs and serves to constitute a convey path for regulating a lower portion of the reversed recording sheet 301. An upper guide 309 is opposed to the pre-guide 308 and serves to constitute a convey path for regulating an upper portion of the recording sheet 301.

A recording portion (ink jet printer) A includes an ink jet cartridge 310 of disposable type comprising a recording head and an ink tank, a carriage 311 on which the ink jet cartridge 310 is mounted and which can be reciprocally shifted to effect the recording, and a platen 312 opposed to the ink jet cartridge 310 and having an image forming portion.

Further, there are arranged a feed roller 313 disposed at an upstream side of the ink jet cartridge 310 and adapted to convey the recording sheet 301, an urging roller 314 urged against the feed roller 313, a sheet discharge roller 315 disposed at a downstream side of the ink jet cartridge 310 and adapted to convey the recording sheet 301 toward a downstream side of the facsimile machine, and spurs 316 urged against the discharge roller 315 and made of material to which the image is not transferred even when the imaged surface of the recording sheet 301 is contacted with the spurs.

A post-guide 317 is provided with a plurality of ribs and serves to constitute a convey path for regulating a lower portion of the recording sheet 301 on which the image was formed at the recording portion A. A frame 310 forms a part of the body 303 of the facsimile machine and is arranged below the post-guide 317 and above the cassette 302. Further, as shown in FIG. 11, the frame 318 has an opening 318a having a predetermined shape and disposed between the ribs. A pair of discharge rollers 319 serve to discharge the recording sheet 301 on which the image was formed onto sheet discharge ribs 320 and a sheet discharge tray 321 formed on the body 303 of the facsimile machine. When an openable cover 322 is opened, a space required for exchanging the ink jet cartridge 310 is also opened and a space above the pre-guide 308 and the post-guide 317 is also opened. Further, a reading system B serves to read image information on an original by a reading sensor.

In this embodiment, while the opening 318a is arranged at a downstream side of the recording portion A, i.e., below the post-guide 317, such opening may be arranged at an upstream side of the recording portion A, i.e., below the pre-guide 308. Further, the cover 322 may be made of transparent material so that the recording sheet being conveyed can be observed without opening the cover 322. The recording portion A is not limited to the ink jet recording type, but may be of electrophotographic type, thermal-transfer type or other appropriate type.

Next, a recording operation of the facsimile machine having the above-mentioned construction will be explained.

When a record start signal is sent from a control portion (not shown), the sheet supply roller 304 is rotated in a direction shown by the arrow in FIG. 10 to convey the recording sheet 301 from the cassette 302 in a direction shown by the arrow R in FIG. 10. The recording sheet 301 is further conveyed by the convey roller 305 and is reversed by the U-turn guide 307 and then is further conveyed in a direction shown by the arrow L in FIG. 10 to reach the recording portion A. In the recording portion A, the image is formed on the recording sheet 301 by the ink jet cartridge 310 while being conveyed by the feed roller 313. Then, after the recording sheet is conveyed by the discharge roller 315, the recording sheet is discharged by the pair of discharge rollers 319.

Figure 12:
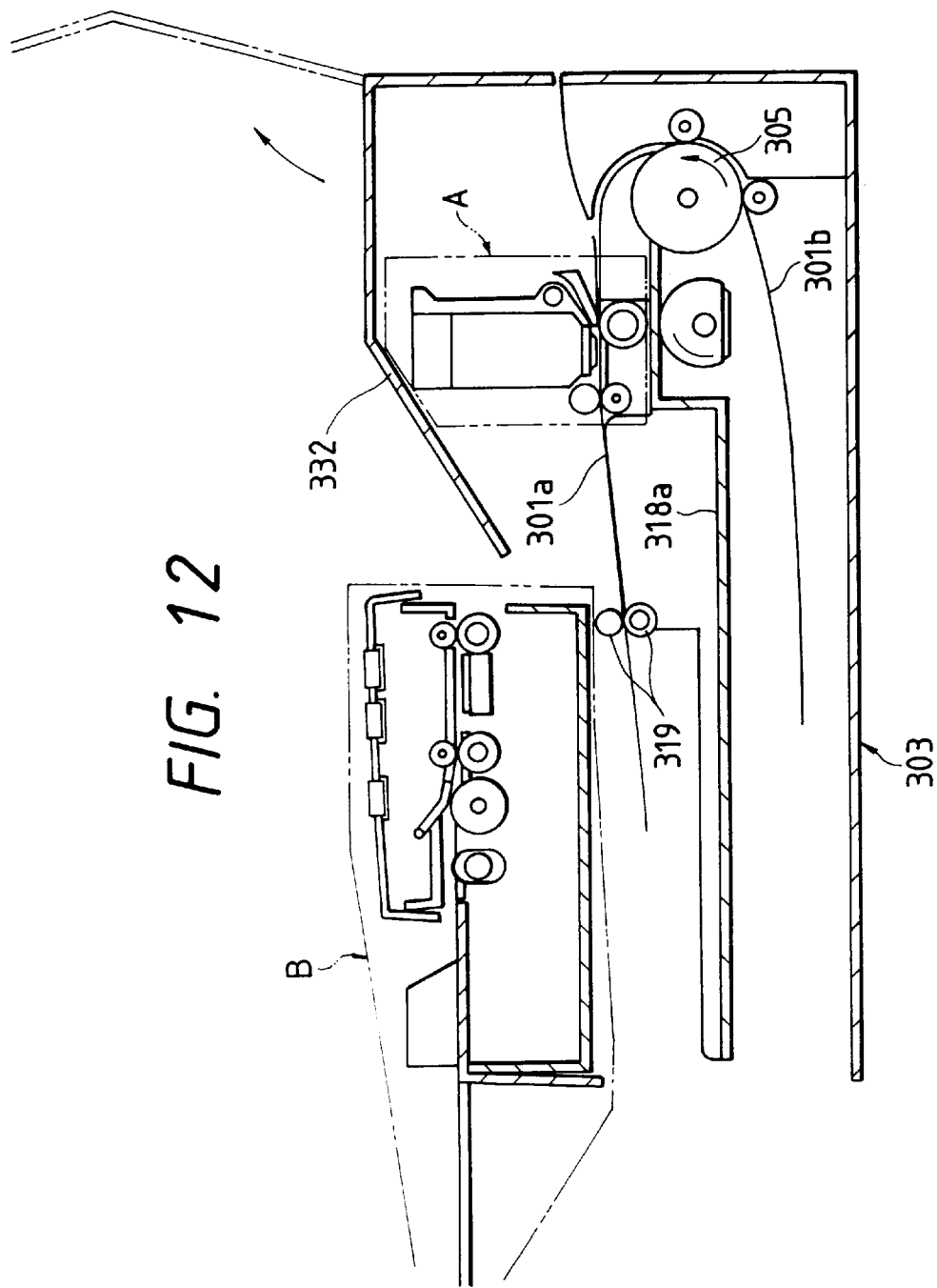
FIG. 12 is a sectional view of the facsimile machine of FIG. 10 showing a condition that a cover is opened.

Next, a recovery operation for correcting the poor feeding of the recording sheet (i.e., the sheet jam) will be explained with reference to FIG. 12.

First of all, when the sheet jam condition is displayed by the control portion (not shown), the cover 322 is opened. If the sheet is jammed in the upper portion of the convey path (i.e., in a portion extending from the convey roller 305 and the pair of discharge rollers 319), only by opening the cover 322, the jammed sheet can be found, and, thus, the jammed sheet is removed by pulling it upwardly. On the other hand, if the sheet is jammed in the lower portion of the convey path (i.e., in a portion at the downstream side of the convey roller 305), by opening the cover 322 and then by observing the interior of the facsimile machine through the opening 318a, the jammed sheet can be found. Then, the jammed sheet 301b is removed by a predetermined removing method (for example, the jammed recording sheet 310b is fed to the upper portion of the convey path by rotating the convey roller 305 by means of a releasing knob (not shown) and then the recording sheet is removed through the opened space obtained by opening the cover 322. Or, the lower portion of the convey path is opened by opening a portion of the body 303 and then the jammed sheet is removed). In this case, the cassette 302 may be retracted from the body 303 of the facsimile machine.

In the above-mentioned first embodiment, while the opening 318a was formed in the frame 318, as a second embodiment, a portion of the frame 318 corresponding to the opening 318a may be formed from a transparent member (not shown). In this case, in comparison with the provision of the opening 318a, there is obtained an advantage that the dust does not drop onto the recording sheets 301 contained in the cassette 302.

Figure 13:
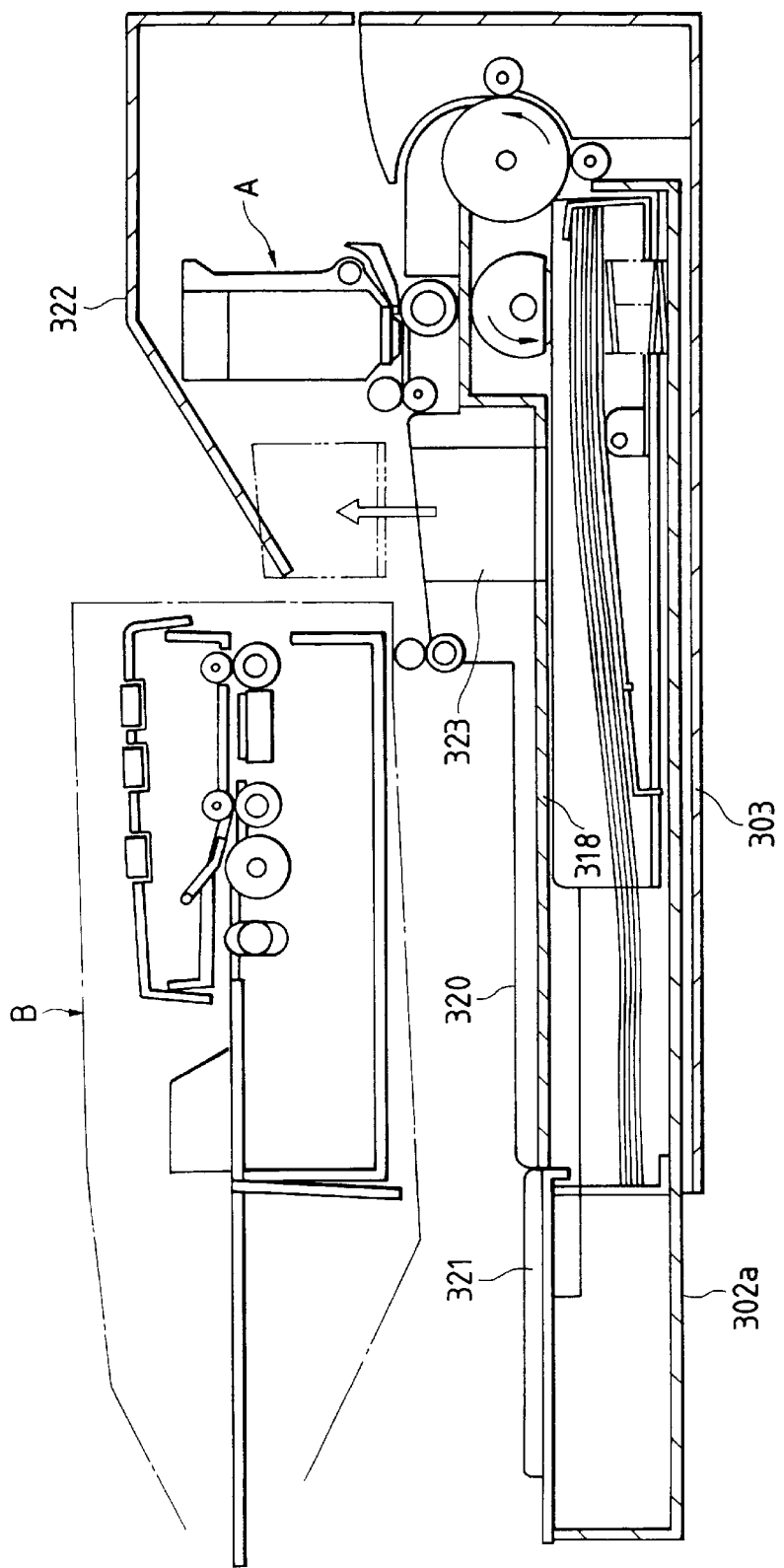
FIG. 13 is a sectional view of a facsimile machine according to a third embodiment of the third invention.
Figure 14:
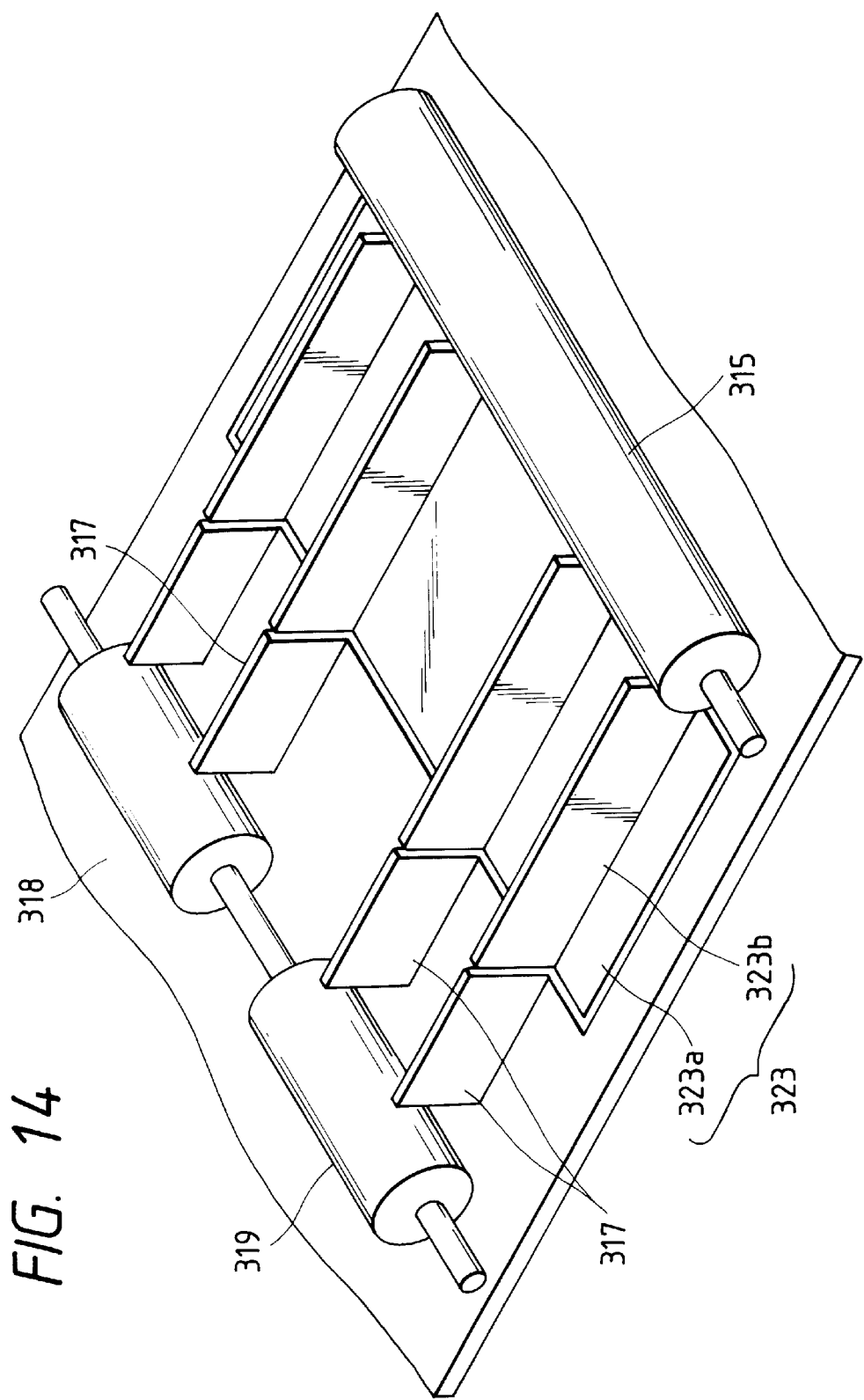
FIG. 14 is a perspective view showing a main portion of FIG. 13.

FIGS. 13 and 14 show a third embodiment of the third invention. In this third embodiment, a releasable frame 323 forming parts of the post-guide 317 and the frame 318 (as shown in the first embodiment) is removably provided. The releasable frame 323 has a frame portion 323a removably attached to the frame 318 in flush with the frame portion, and guide or rib portions 323b cooperating with the ribs of the postguide 317 to form the convey path.

Further, as shown in FIG. 13, by dismounting the releasable frame 323 upwardly, a space below the frame 318 can be opened. Accordingly, it is possible to find the recording sheet 310b jammed in the body 303 of the facsimile machine and to directly remove the jammed sheet only by opening the cover 322.

Next, a recording apparatus according to a fourth invention of this application will be explained with reference to the accompanying drawings.

Figure 15:
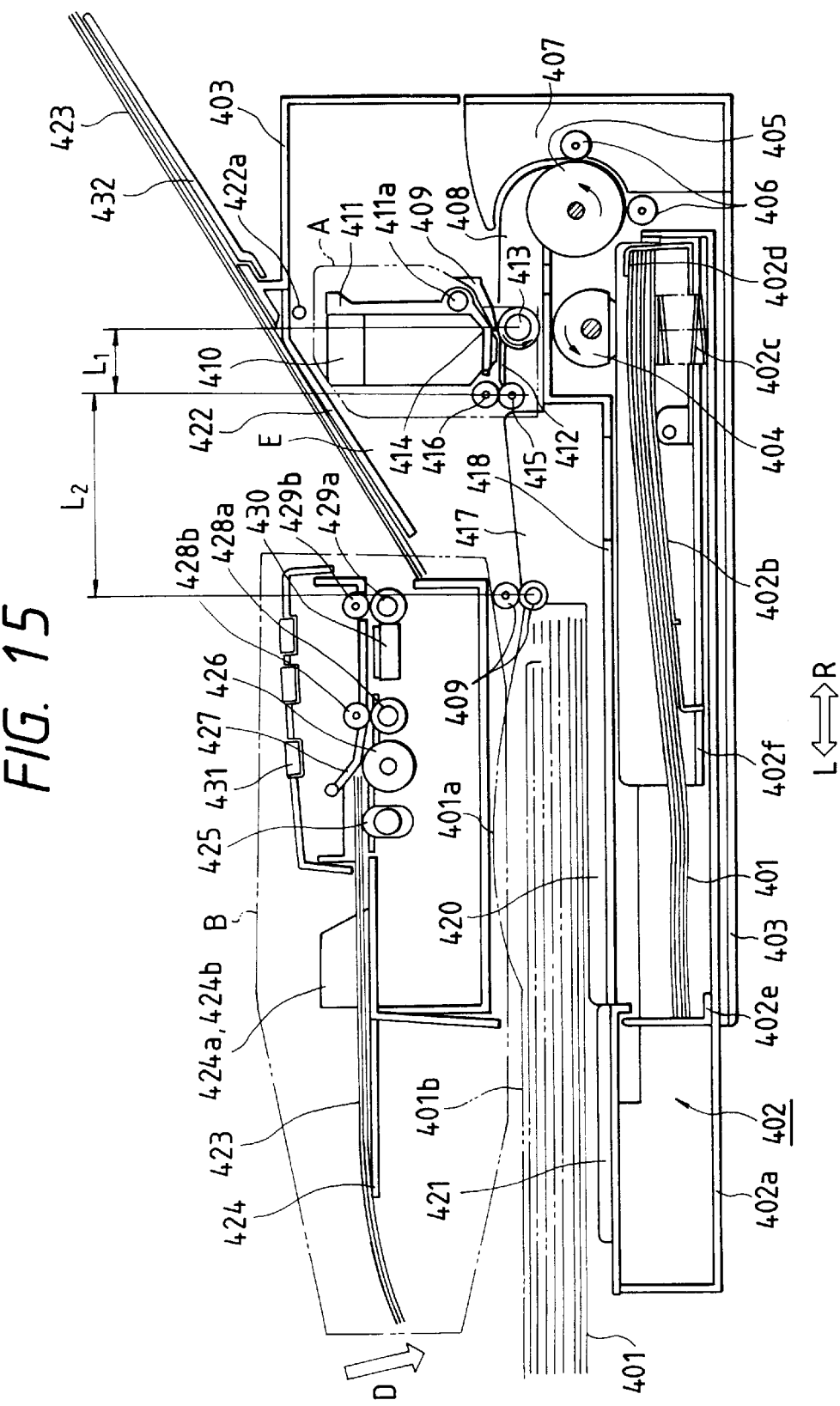
FIG. 15 is a sectional view showing a schematic construction of a facsimile machine according to a first embodiment of a fourth invention.
Figure 16:
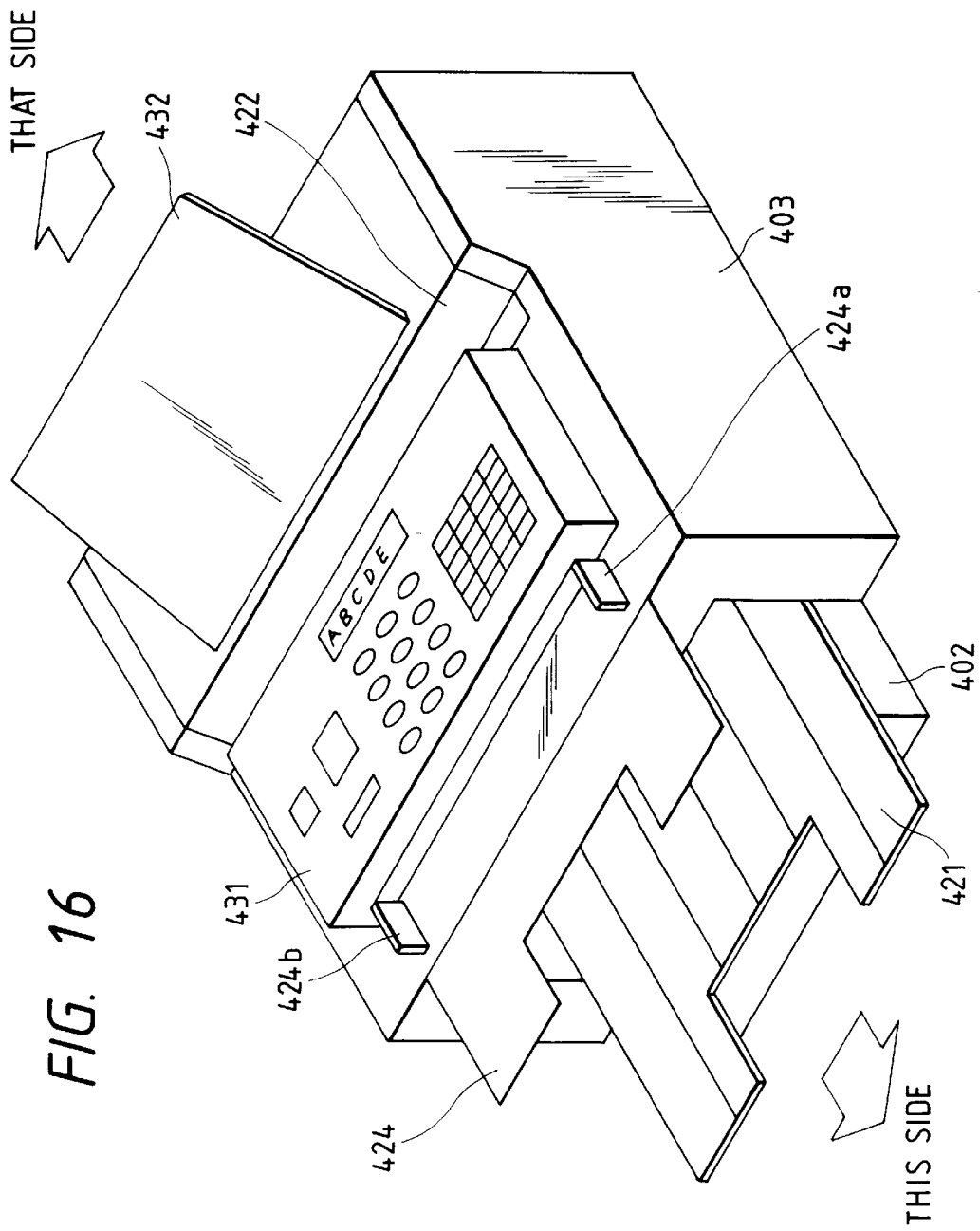
FIG. 16 is a perspective view of the facsimile machine of FIG. 15.
Figure 17:
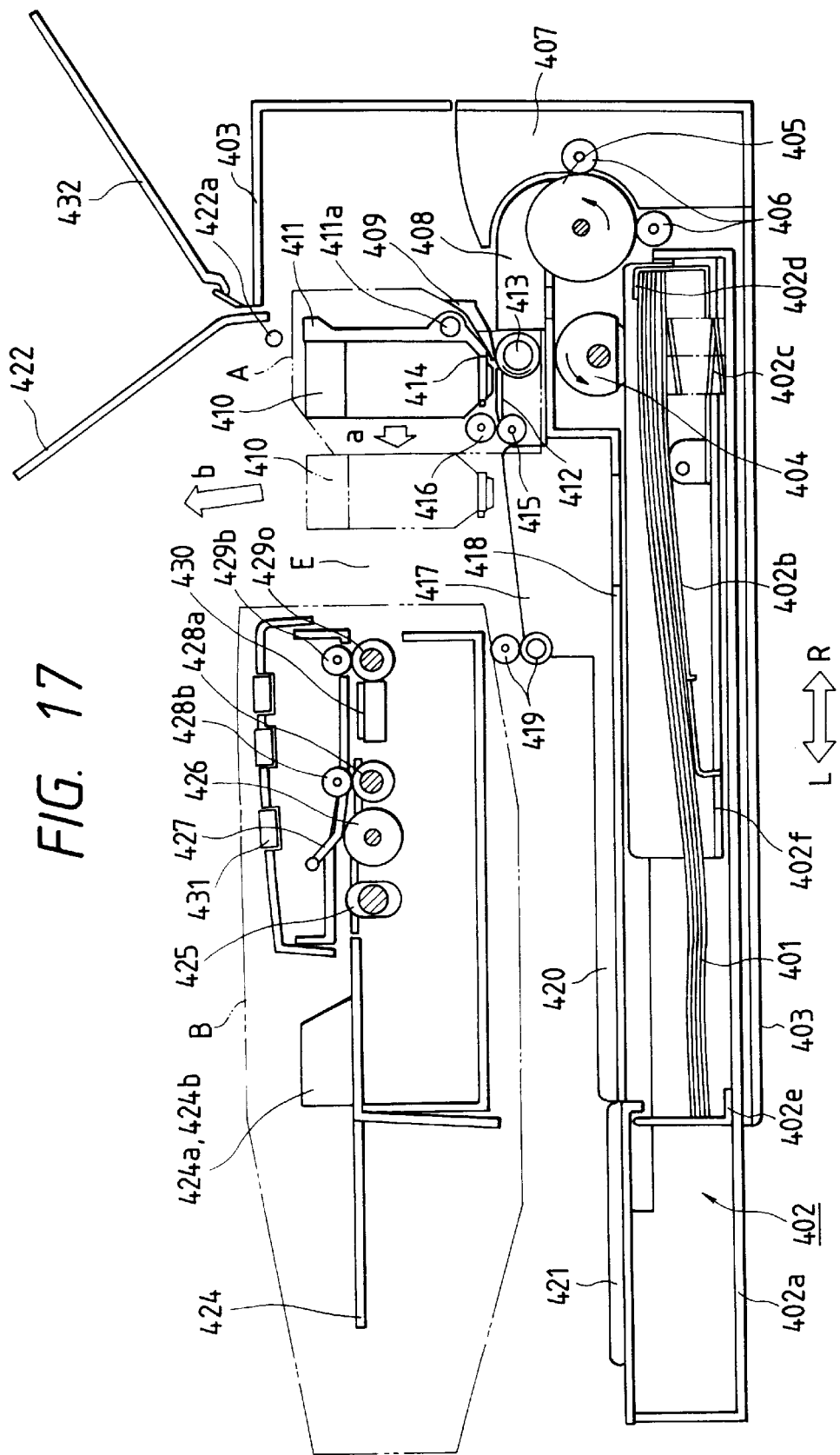
FIG. 17 is a sectional view for explaining an ink cartridge exchanging operation.

Here, the recording apparatus is shown as a facsimile machine of ink jet recording type. FIG. 15 is a sectional view showing a schematic construction of the facsimile machine, FIG. 16 is a perspective view showing an appearance of the facsimile machine, and FIG. 17 is a view for explaining an ink cartridge exchanging operation.

First of all, the schematic construction of the facsimile machine will be described with reference to FIGS. 15 and 16. The facsimile machine comprises a recording system for forming an image on a recording sheet 401, and a reading system for reading an image on an original 423.

(Recording System)
(Recording Sheet Stacking Means)

In FIG. 15, a cassette (recording sheet stacking means) 402 accommodates a plurality of stacked recording sheets 401 and is removably mounted to a body 403 of the facsimile machine. The cassette 402 comprises a box 402a, an intermediate plate 402b disposed on the bottom of the box 402a, a spring 402c for pushing up the intermediate plate 402b, a pawl 402d for catching tip ends of the recording sheet 401, and regulating plates 402e, 402f for regulating lengths and widths of the recording sheets 401. Mounting and dismounting directions of the cassette 402 are directions shown by the arrows R and L toward the right and left in FIG. 15 (that side and this side in FIG. 16). A pick-up roller 404 serves to feed out the recording sheets 401 stacked in the cassettes 402 from the uppermost one. The recording sheets 401 fed out by the pick-up roller 404 are separated one by one by the pawl 402d of the cassette 402.

(Reverse Rotation Convey Means)

A reverse rotation convey roller (reverse rotation convey means) 405 cooperates with an urging roller 406 urged against the reverse rotation convey roller to pinch the recording sheet 401 therebetween and to reverse (turn up) and convey the recording sheet. A reverse rotation guide 407 serves to guide the recording sheet 401 reversed by the reverse rotation convey roller 405. A pre-guide 408 is provided with a plurality of ribs and serves to constitute a convey path for supporting the back surface of the reversed recording sheet 401 and for directing the sheet to an image forming portion. An upper guide 409 is opposed to the pre-guide 408 and serves to constitute a convey path for regulating the front surface of the recording sheet 401 and for directing the sheet to the image forming portion.

(Recording Means)

A recording portion A includes an ink jet cartridge (recording means) 410, a carraige 411, a platen 412, a feed roller 413, an urging roller 414, a first discharge roller 415 and spurs 416 (first discharge means). The recording means serves to form an ink image on the recording sheet 401 conveyed to the image forming portion. The recording means is of ink jet recording type wherein the image is formed on the recording sheet by discharging ink from a recording head. The recording head has small liquid discharge openings (orifices), liquid passages, energy acting portions provided in portions of the liquid passages, and energy generating means for generating liquid droplet forming energy applied to each energy acting portion.

Such energy generating means may be, for example, a pressure energy generating means using electrical/mechanical converters such as piezo-electric elements, an electromagnetic energy generating means for discharging liquid droplet by heating the liquid by the electro-magnetic wave such as laser, or a thermal energy generating means for discharging liquid by heating the liquid by means of electrical/thermal converters such as heat generating elements having heat generating resistors.

Among them, in the recording head of ink jet recording type wherein the liquid is discharged by the thermal energy, since the liquid discharge openings (orifices) for forming the liquid droplets by discharging the liquid can be arranged with high density, the image can be formed with high resolving power. Among them, the recording head using the electrical/thermal converters as the energy generating means is advantageous, since it can be easily made compacted and can fully utilize the advantages of the IC technique and micro working technique which have been remarkably progressed in the recent semi-conductor field and can be mounted with high density and its manufacturing cost is inexpensive.

In the illustrated embodiment, as shown in FIG. 15, the ink jet cartridge 410 of disposable type integrally comprising a recording head and an ink tank is used. The platen 412 for supporting the recording sheet 401 is opposed to the ink jet cartridge 410. An image forming portion for forming the image on the recording sheet 401 is provided on the platen 412. Further, the feed roller 413 and the urging roller 414 serve to direct the recording sheet to the image forming portion and determine a convey speed of the recording sheet 401 during the image formation.

(Carriage)

The carriage 411 can mount the ink jet cartridge 410 thereon and can be reciprocally shifted (scanned) in a widthwise direction of the recording sheet 401 (direction perpendicular to the plane of FIG. 15). An endless timing belt mounted on pulleys driven by a drive source (not shown) is connected to the carriage 411 so that the carriage 411 is reciprocally shifted along a guide rail 411a by driving the pulleys.

(First and Second Discharge Means)

The first discharge roller 415 and spurs 416 serve to convey the recording sheet 401 on which the image was formed, and the spurs 416 are made of material to which the ink is not transferred even when the imaged surface of the recording sheet is contacted with the spurs. A post-guide 417 defines a convey path for guiding the back surface of the recording sheet 401 conveyed by the first discharge roller 415 and spurs 416 and for directing the sheet to the second discharge means. A frame 418 forms a part of the body 403 of the facsimile machine and is arranged below the post-guide 417 and above the cassette 402.

A pair of second discharge rollers (second discharge means) 419 serve to convey the recording sheet 401 conveyed on the post-guide 417 and to discharge the recording sheet onto discharge ribs 420 and a discharge tray 421 adjacent to the ribs. As shown in FIG. 16, a U-shaped notch is formed in a central portion of the front (this side of the facsimile machine) surface of the discharge tray, thereby facilitating the removal of the stacked recording sheets 401.

The pair of second discharge rollers 419 are arranged, with respect to the body 403 of the facsimile machine, so that at least a distance $L_1$ between the feed roller 413 and the first discharge roller 415 becomes shorter than a distance $L_2$ between the first discharge roller 415 and the pair of second discharge rollers 419 ($L_1 < L_2$). Now, the distance $L_2$ between the first discharge roller 415 and the pair of second discharge rollers 419 may be determined so that the ink discharged on the recording sheet 401 is solidified before the recording sheet passes through the pair of second discharge rollers 419, in consideration of the solidifying ability of the ink to be used, a discharged amount of the ink onto the recording sheet 401 per unit area, the recording speed and the conveying speed of the recording sheet 401.

(Space Portion)

A space E is provided above the post-guide 417 disposed between the first discharge roller 415 and the pair of second discharge rollers 419, and a cover 422 for opening and closing the space E is pivotally mounted around a hinge means 422a. The space E is opened by rotating the cover 422 around the hinge means 422a toward that side of the facsimile machine (toward a direction shown by the arrow R), whereby a space above the pre-guide 408 and the post-guide 417 is also opened.

(Recording Operation)

Next, a recording operation of the recording apparatus having the above-mentioned construction will be explained.

When the command for starting the recording operation is given from a computer (not shown) and the like, the pick-up roller 404 is rotated in a direction (anti-clockwise direction) shown by the arrow in FIG. 15 to feed out and separate the recording sheets 401 stacked in the cassette 402 one by one from the uppermost one. The recording sheet 401 fed out by the pick-up roller 404 is pinched between the reverse rotation convey roller 405 and the pinch roller 406 and is reversed and conveyed by these rollers to pass between the pre-guide 408 and the upper guide 408. Then, the recording sheet is pinched between the feed roller 413 and the urging roller 414 to reach the image forming portion. The recording operation is effected by discharging the ink from the ink jet cartridge 410 in response to the image information while reciprocally shifting the carriage 411. After the recording, the recording sheet 401 is pinched and conveyed by the first discharge roller 415 and the spurs 416 to pass through the post-guide 417 and then is discharged onto the discharge ribs 420 and the discharge tray 421 by the pair of second discharge rollers 419.

(Cartridge Exchanging Operation)

Next, an ink jet cartridge exchanging operation in the recording system will be explained with reference to FIG. 17.

In the recording operation, if the poor ink discharge is caused in the ink jet cartridge 410, the ink jet cartridge must be exchanged by a new one. As mentioned above, the cover 422 is pivotally mounted around the hinge means 422a. First of all, the operator rotates the cover 422 around the hinge means 422a as shown in FIG. 17, thereby opening the space E. Then, a locking condition of the ink jet cartridge 410 mounted on the carriage 411 is released by manipulating a release lever (not shown). Then, after the ink jet cartridge 410 is retracted toward a direction a into the space E, by lifting the cartridge toward a direction b, the cartridge can be removed. A new ink jet cartridge 410 can be mounted to the facsimile machine by repeating the above steps reversely.

With the arrangement mentioned above, since the ink jet cartridge can be exchanged by utilizing the space formed above the post-guide 417 between the first discharge roller 415 and the pair of second discharge rollers 419, the space in the facsimile machine can be reduced, thereby making the facsimile machine small-sized. Further, when the space E is opened, since the pre-guide 408 and the post-guide 417 are also exposed, even if the recording sheet 401 is jammed in these guides, the jammed sheet can easily be removed only by opening the cover 422.

Further, when a large amount of recording sheets 401 are discharged on the discharge tray 421, as shown in FIG. 15, since the next recording sheet is discharged so that a trailing end 401b of the previously discharged recording sheet is pushed out by a tip end 401a of the next recording sheet, although the recording sheets may be discharged out of order, the image quality is prevented from being deteriorated by rubbing the imaged surface of the previously discharged recording sheet 401b and the sheet jam is also prevented. Further, since the stacking position for the discharged recording sheet 401 is shifted toward the direction shown by the arrow L in FIG. 15, even when an original stacking tray 424 (described later) is positioned above the discharge ribs 420 and discharge tray 421, the operator can easily ascertain the imaged surface of the discharged recording sheet 401 from a direction shown by the arrow D.

As mentioned above, if the stacking position for the discharged recording sheets 401 is shifted toward the direction L in FIG. 15, since the protruded amount of the discharged recording sheets 401 from the discharge tray 421 is increased, the installation space for the facsimile machine will also be increased. However, no problem occurs even if the stacking position for the discharged recording sheets 401 is shifted toward the direciton L, since the recording sheet 401 from the cassette 402 is reversely conveyed and the cassette 402 is mounted to the facsimile machine toward the direction L.

(Reading System)

Next, the construction of the reading system of the facsimile machine will be explained with reference to FIGS. 15 and 16. Various elements of the reading system B will be described hereinbelow.

(Original Convey Means)

The above-mentioned original stacking tray 424 serves to stack a plurality of originals 423 thereon. The original stacking tray 424 is positioned at the front side (left side) of the facsimile machine and its length in the direction L is longer than a length of the original 423. Further, the original stacking tray 424 has a U-shaped notch formed in a central portion of its front portion as shown in FIG. 16 to facilitate the observation of the recording sheet 401 discharged below the original stacking tray. However, the whole original stacking tray may be formed from transparent material.

The originals 423 stacked on the original stacking tray 424 are laterally positioned by original side guides 424a, 424b. A pre-convey roller 425 serves to previously convey the originals 423 stacked on the original stacking tray 424 toward a downstream side. A friction pad 427 is urged against a separation roller 426. The separation roller 426 cooperates with the friction pad 427 to separate the originals 423 one by one. The separated original 423 is conveyed by a pair of original convey rollers 428a, 428b and a pair of original discharge rollers 429a, 429b.

(Reading Means)

A photoelectric conversion sensor (reading means) 430 has a light source therein and serves to read an image on the original by photoelectrically converting the reflected light reflected by the original surface (emitted from the light source). The image on the original 423 is read by the photoelectric conversion sensor 430 while the original 423 being conveyed between the pair of original convey rollers 428a, 428b and the pair of original discharge rollers 429a, 429b. After the reading, the original 423 is discharged onto the cover 422.

Further, the original convey means and the reading means are arranged so that they are disposed at positions lower than the recording means. That is to say, the height of the whole facsimile machine is reduced in comparison with the conventional facsimile machine, thereby aiding the compactness of the facsimile machine. Incidentally, the reference numeral 431 denotes an operation panel including a ten-key, various function keys and various display portions.

(Original Discharge Tray)

As mentioned above, the cover 422 is inclined from this side (left) to that side (right) of the facsimile machine. A front end portion of the cover 422 is extended into the space E, and an original discharge tray 432 is removably attached to a rear end of the cover 422 contiguous to the cover. The original 423 conveyed by the pair of original discharge rollers 429a, 429b is discharged onto the cover 422 and the original discharge tray 432 in such a manner that trailing ends of the discharged originals are aligned with each other. Incidentally, as shown in FIG. 17, the original discharge tray 432 may not be dismounted when the cover 422 is opened.

By utilizing the cover 422 as a part of the discharge tray, the number of parts can be reduced, thereby making the facsimile machine inexpensive. Further, since the original discharge tray is not dismounted when the ink jet cartridge 410 is exchanged, the operability is improved.

Next, a second embodiment of the fourth invention will be explained with reference to FIG. 18. In this embodiment, a manipulating position for the operator who manipulates the facsimile machine is differentiated from that in the first embodiment.

Figure 18:
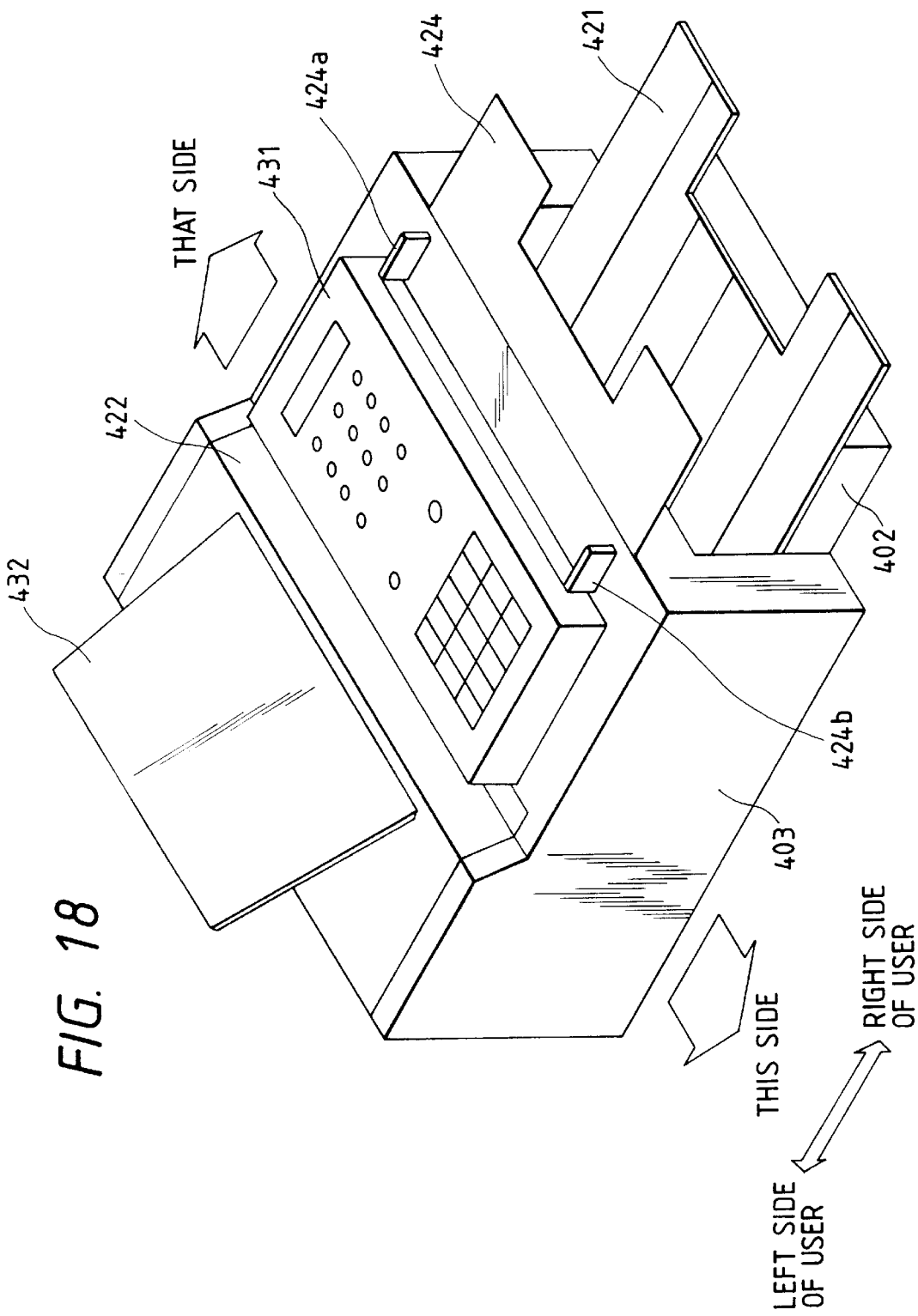
FIG. 18 is a perspective view of a facsimile machine according to a second embodiment of the fourth invention.
Figure 19:
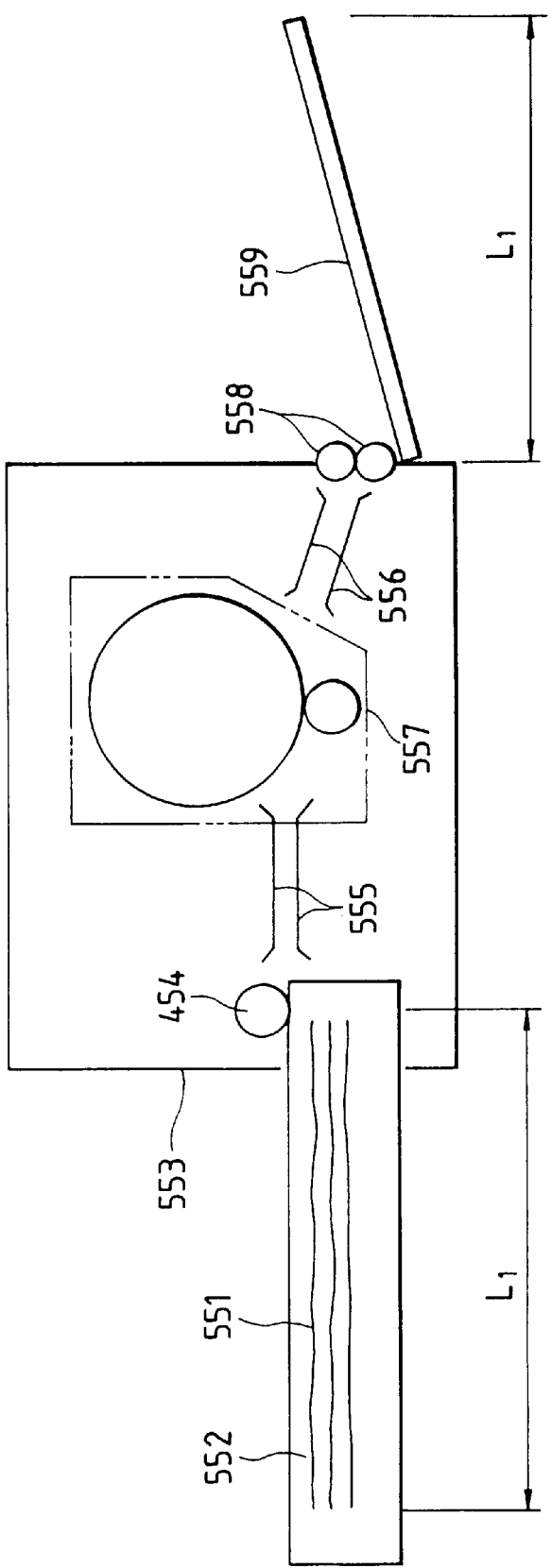
FIG. 19 is a sectional view of a conventional copying machine.
Figure 20:
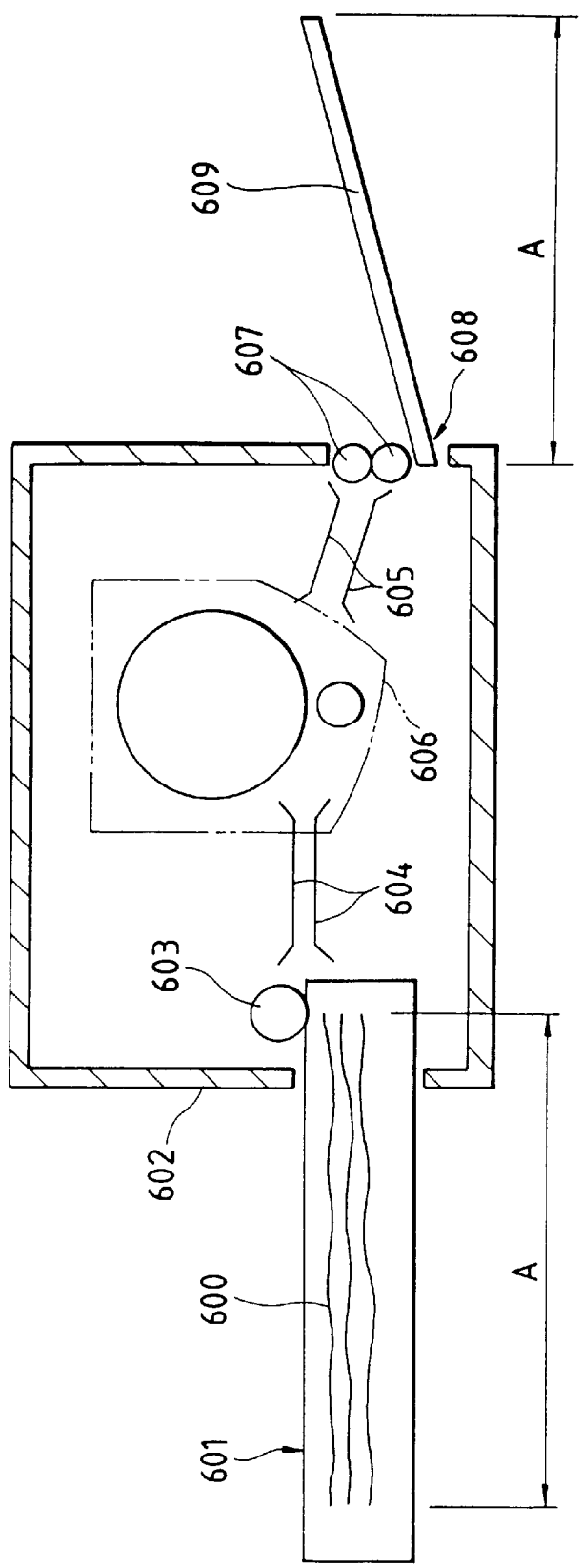
FIG. 20 is a sectional view of another conventional copying machine.
Figure 21:
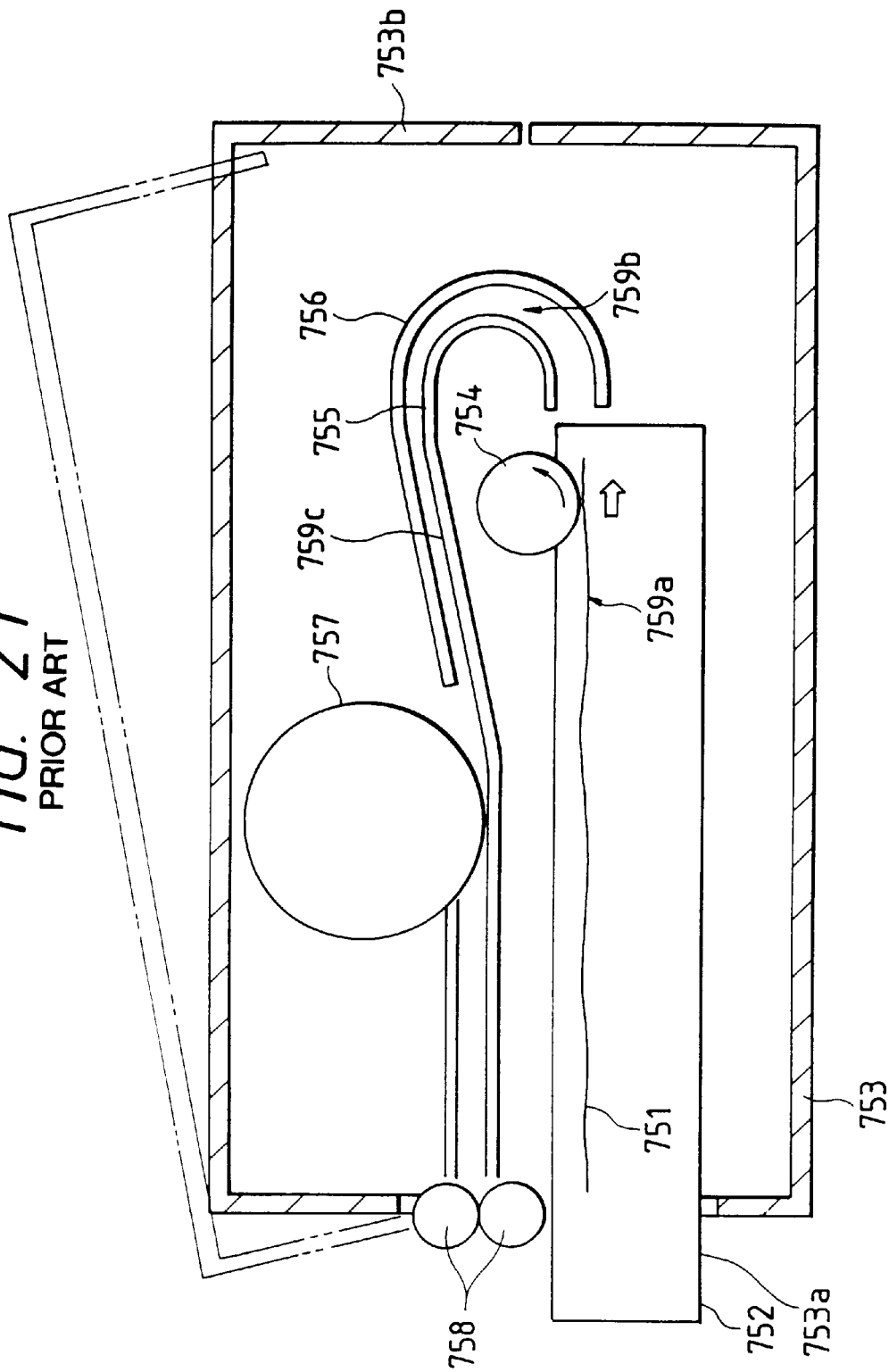
FIG. 21 is a sectional view of a further conventional copying machine.
Figure 22:
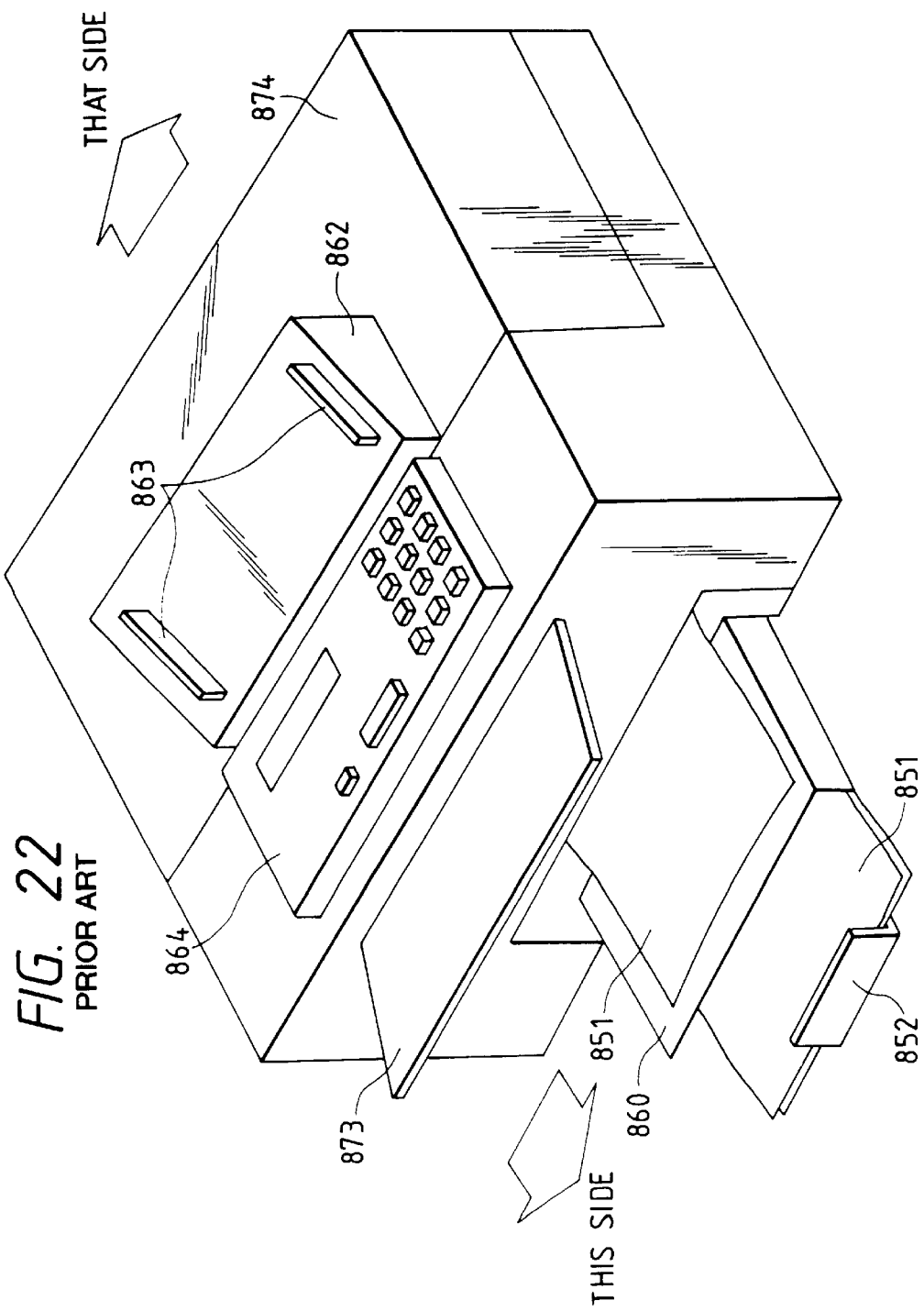
FIG. 22 is a perspective view showing an appearance of the conventional facsimile machine.
Figure 23:
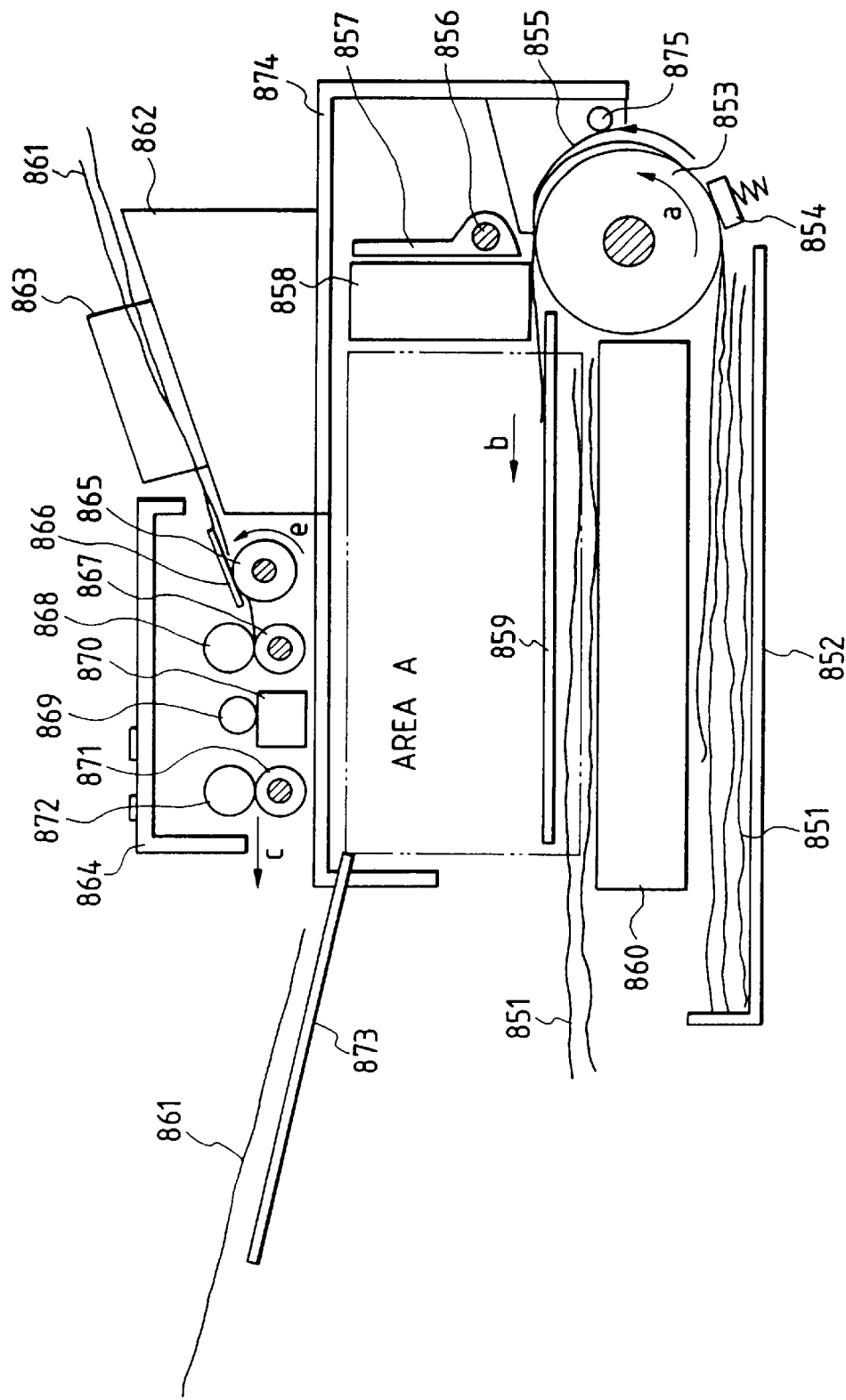
FIG. 23 is a sectional view showing a schematic construction of the conventional facsimile machine.
Figure 24:
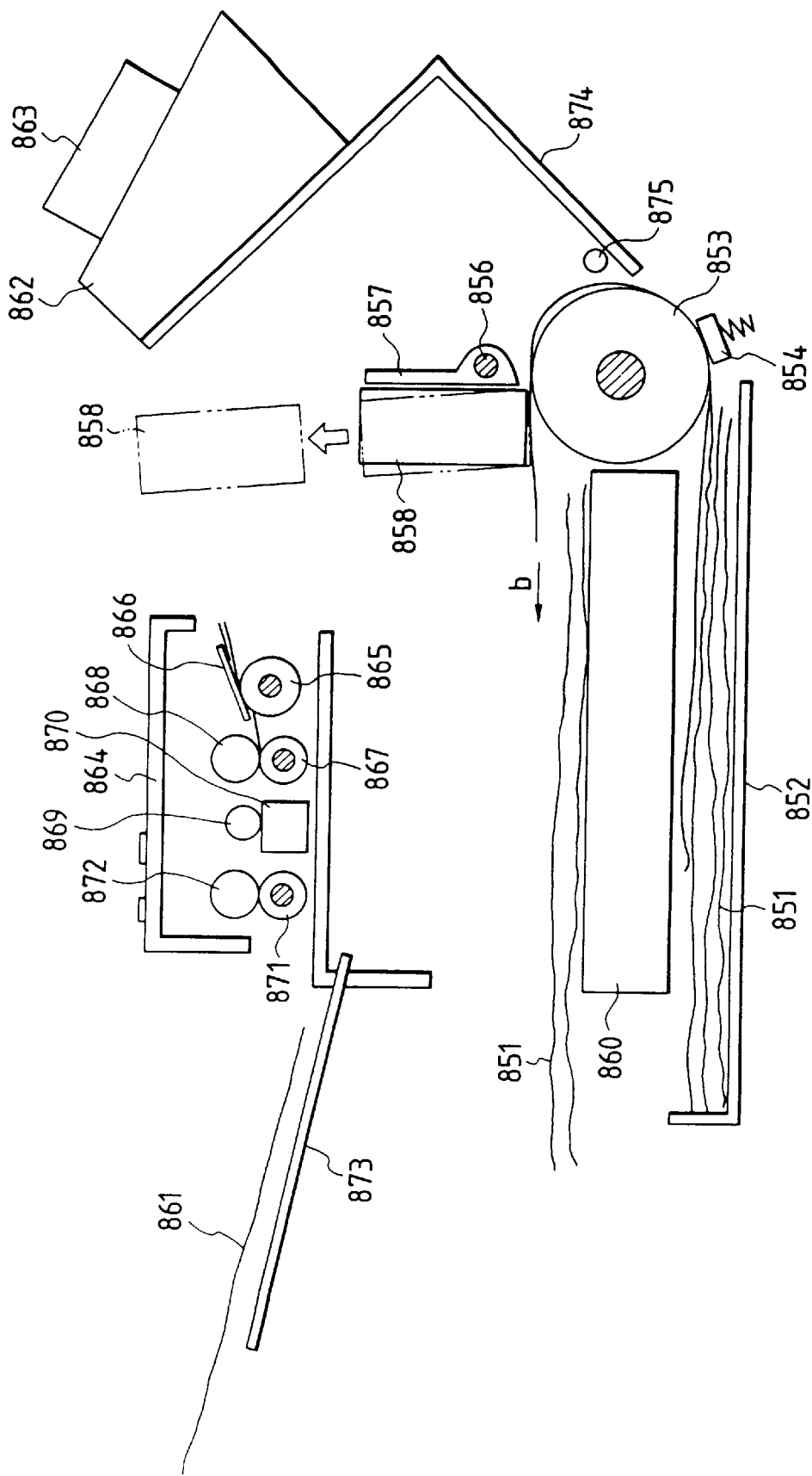
FIG. 24 is a view for explaining a conventional ink cartridge exchanging operation.
Figure 25:
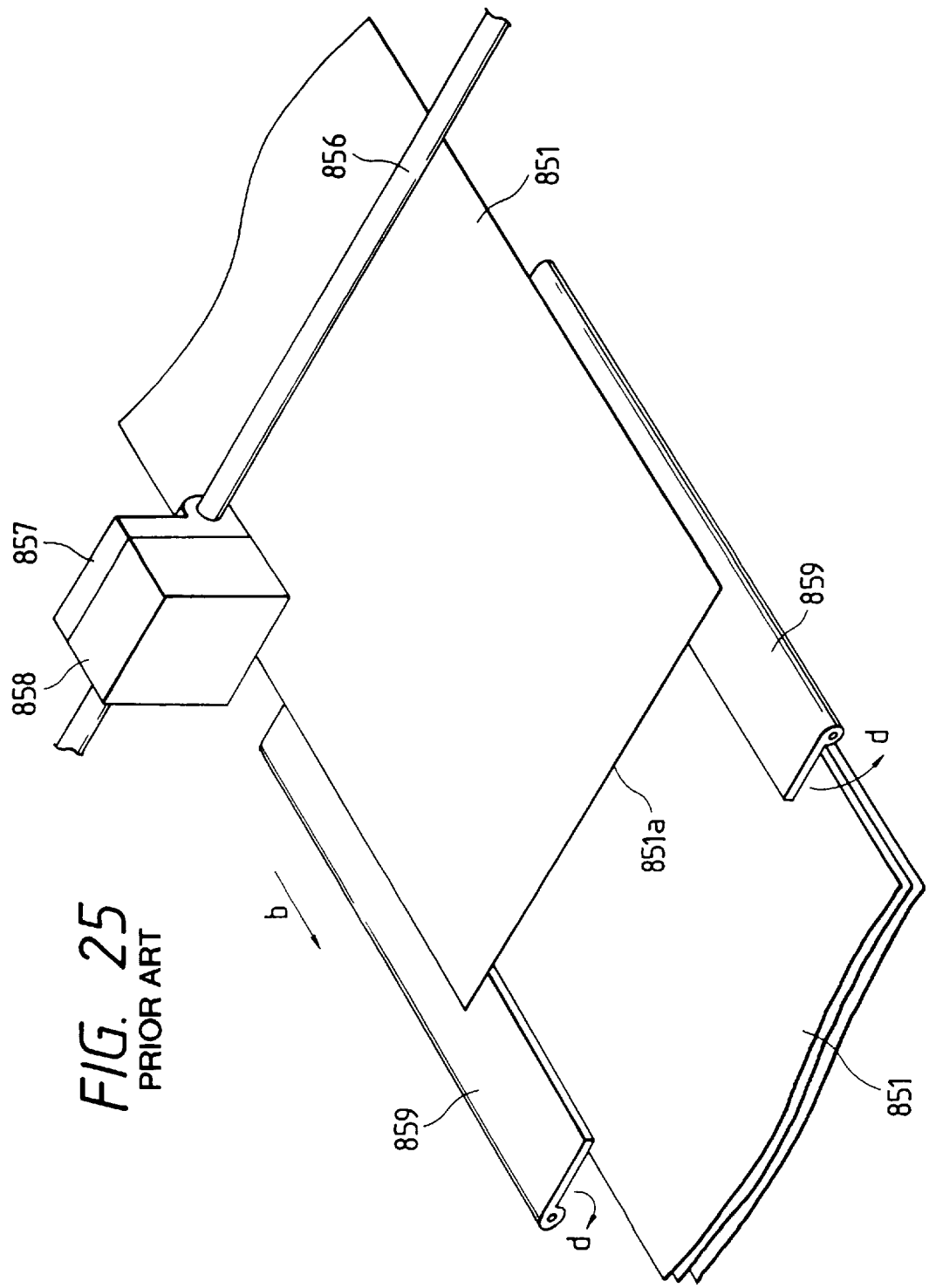
FIGS. 25 and 26 are views for explaining a conventional recording sheet discharge operation.
Figure 26:
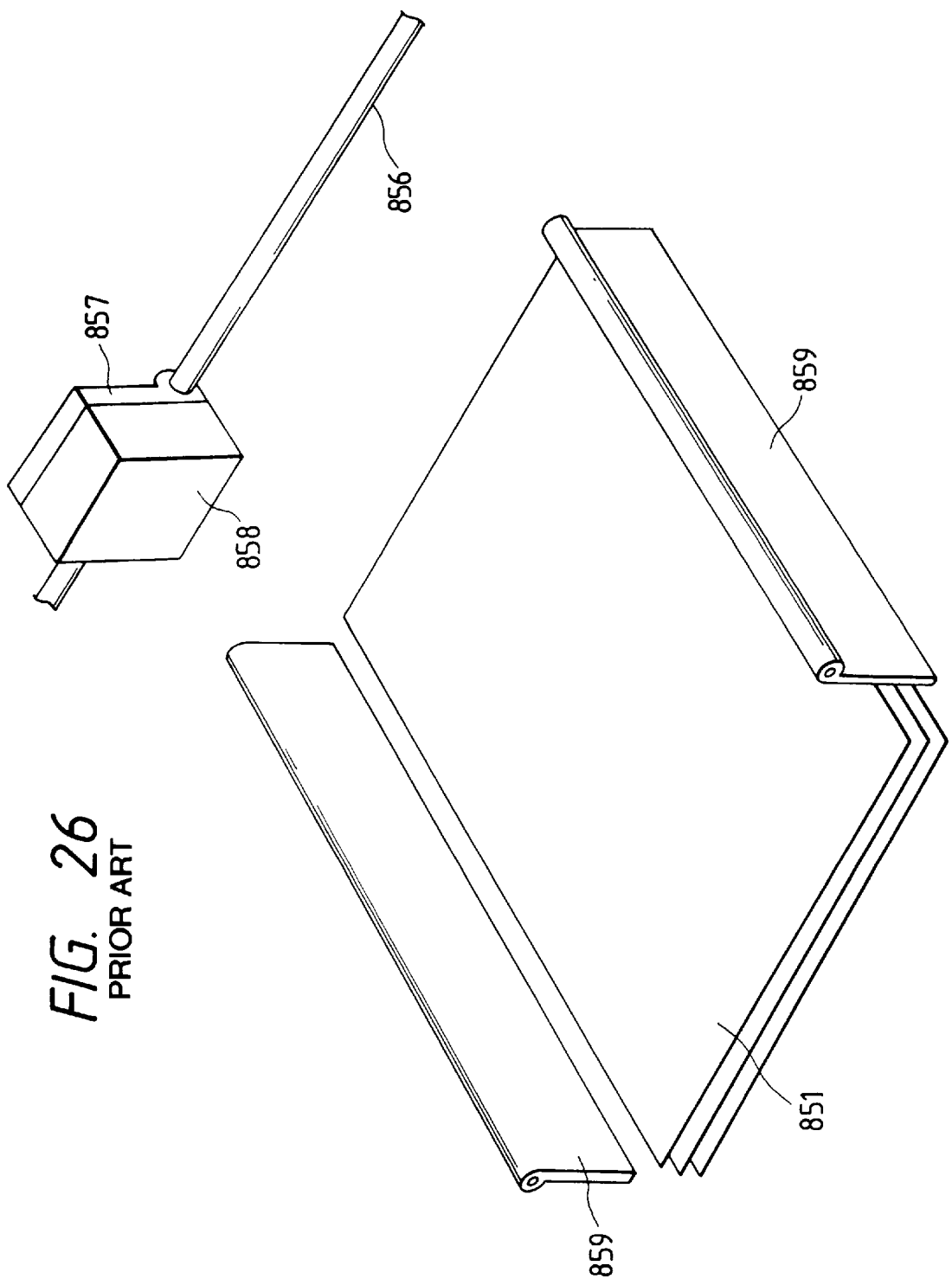

In FIG. 18, the operator manipulates the facsimile machine from this side thereof. Thus, the ten-key, function keys and display portions disposed on the operation panel 431 are arranged so that they are maniuplated from this side of the facsimile machine.

The originals 423 are stacked on the original stacking tray 424 arranged at right side of the user (operator), and the original is conveyed toward the left side of the user, meanwhile, the image on the original is read. Then, the original is discharged onto the cover 422 and the original discharge tray 432. Further, the recording sheets 401 are stacked in the cassette 402 arranged at right side of the user, and the recording sheet is conveyed toward the left side of the user and then is reversed to be sent to the image forming portion. After the recording, the recording sheet is conveyed toward the right side of the user and is discharged onto the discharge tray 421.

In the above embodiments, while the ink jet cartridge of ink jet recording type was used as the recording means, as a third embodiment, more preferably, the recording means is designed so that the recording is effected by discharging ink by the growth and contraction of a bubble generated in the ink by utilizing the film boiling caused in the ink by thermal energy applied to the ink by means of a electro-thermal convertor in response to a recording signal.

It is preferable to employ the typical structure and the principle of structures disclosed in, for example, U.S. Pat. Nos. 4,723,129 and 4,740,796. This system can be adopted in a so-called "On-Demand" type and "Continuous" type structures. In this system, an electro-thermal conversion member disposed to align to a sheet or a liquid passage in which liquid (ink) is held is supplied with at least one drive signal which corresponds to information to be recorded and which enables the temperature of the electro-thermal conversion member to be raised higher than a nuclear boiling point, so that thermal energy is generated in the electro-thermal conversion member and film boiling is caused to take place on the surface of the recording head which is heated. As a result, bubbles can be respectively formed in liquid (ink) in response to the drive signals. Due to the enlargement and contraction of the bubble, liquid (ink) is discharged through the discharge port, so that at least one droplet is formed. In a case where the aforesaid drive signal is made to be a pulse signal, a further satisfactory effect can be obtained in that the bubble can immediately and properly be enlarged/contract and liquid (ink) can be discharged while exhibiting excellent responsibility.

It is preferable to employ a drive signal of the pulse signal type disclosed in U.S. Pat. Nos. 4,463,359 and 4,345,262. Furthermore, in a case where conditions for determining the temperature rise ratio on the aforesaid heated surface disclosed in U.S. Pat. No. 4,313,124 are adopted, a further excellent recording operation can be performed.

In addition to the structure (a linear liquid passage or a perpendicular liquid passage) of the recording head formed by combining the discharge ports, the liquid passage and the electro-thermal conversion member as disclosed in the aforesaid specifications, a structure disclosed in U.S. Pat. Nos. 4,558,333 and 4,459,600 in which the heated portion is disposed in a bent portion is included in the scope of the present invention.

Furthermore, the present invention can effectively be embodied in a structure in which a common slit is made to be the discharge portion of a plurality of electro-thermal conversion members and which is disclosed in Japanese Patent Appln. Laid-Open No. 59-123670 and a structure in which an opening for absorbing thermal energy pressure wave is formed to align to the discharge port and which is disclosed in Japanese Patent Appln. Laid-Open No. 59-138461.

A full line type recording head having a length which corresponds to the width of the maximum recording medium which can be recorded by the recording apparatus may be a structure capable of realizing the aforesaid length and formed by combining a plurality of recording heads as disclosed in the aforesaid specifications or a structure formed by a integrally formed recording head. The present invention will enable the aforesaid effects to be exhibited further effectively. In addition, the present invention can also be effectively adapted to a structure having an interchangeable chip type recording head which can be electrically connected to the body of the apparatus or to which ink can be supplied from the body of the apparatus when it is mounted on the body of the apparatus or a cartridge type recording head integrally formed to the recording head.

Further, it is preferable that a head recovering means and an auxiliary aiding means are added to the recording apparatus according to the present invention, since the effect of the present invention is further improved. More concretely, these means include a capping means for capping the recording head, a cleaning means, a pressurizing or suction means, and an auxiliary heating means comprising electro-thermal converters or other heating elements or the combination thereof. Further, it is effective for the stable recording to perform an auxiliary discharge mode wherein the ink discharge regardless of the recording ink discharge is effected.

Further, regarding the kind and number of the recording heads mounted on the carriage, for example, a single recording head corresponding to single color ink or a plurality of recording heads corresponding to different colors or densities may be provided. That is to say, for example, as recording modes of the recording apparatus, the present invention can be applied not only to a recording apparatus having a recording mode with a single main color such as black, but also to an apparatus providing a plurality of different colors and/or a full-color by mixing colors by using an integrated recording head or the combination of plural recording heads.

Further, in the illustrated embodiments, while the ink was liquid, the ink may be solid in a room temperature or less, or may be softened at a room temperature. In the above-mentioned ink jet recording system, since the temperature control is generally effected in a temperature range from 30° C. to 70° C. so that the viscosity of the ink is maintained within a stable discharging range, the ink may be liquidized when the record signal is emitted. In addition, ink having a feature that is firstly liquidized by the thermal energy, such as solid ink which serves to prevent the increase in temperature by absorbing energy in changing the ink from the solid state to the liquid state or which is in the solid state in the preserved condition to prevent the vaporization of ink and which is liquidized into ink liquid to be discharged in response to the record signal comprising the thermal energy, or ink which has already been solidified upon reaching the recording medium, can also be applied to the present invention.

In such a case, the ink can be held in the liquid state or solid state in recesses or holos in porous sheet as disclosed in the Japanese Patent Appin. Laid-Open Nos. 54-56847 and 60-71260, in confronting relation to the electrical/thermal converters. Incidentally, in the present invention, the above-mentioned film boiling principle is most effective for each ink. Further, the aforementioned recording apparatus may be used as image output terminals of information processing equipments, or as copying machines combined with readers and the like.

Incidentally, while an example that the recording means of ink jet recording type is used was explained, the recording means is not limited to the ink jet recording type, but may be of thermal-transfer recording type, heat-sensitive recording type, or other recording types other than impact recording types such as wire dot recording type. Further, the recording means is not limited to the serial recording type, but may be of a so-called line recording type.

What is claimed is:

1. A recording apparatus, comprising:

reading means for reading an image on an original;

recording means for forming an image on a sheet by discharging an ink droplet;

discharge means for discharging the sheet on which the image was formed by said recording means;

a convey path provided below said reading means, and between said recording means and discharging means, said convey path being extended substantially horizontally;

convey means for conveying the sheet on which the image was formed by said recording means along said convey path, said convey means being provided at an end of said convey path on a side of said recording means; and wherein said reading means reads the image while conveying the original in a direction substantially parallel to and opposite to a conveying direction in said convey path;

an outer cover for covering a body of the recording apparatus, said outer cover having a recess formed therein;

wherein said discharge means is positioned in an interior most portion of said recess, and the sheets discharged by said discharge means are stacked on a bottom surface of said recess, and said reading means is provided over said discharge means and said bottom surface, and a sheet of minimum length to be used is positioned in a deeper portion of said recess than a side wall of said outer cover when the sheet of minimum length is discharged on the bottom surface by said discharge means.

2. A recording apparatus according to claim 1, wherein said discharge means discharges a sheet having a minimum length so that a tip end of the sheet is positioned toward an interior portion of the recording apparatus more than the side wall portion of said outer cover.

3. A recording apparatus according to claim 1, wherein a notch for permitting visual observation of the sheet discharged on the bottom surface of said recess is formed in said outer cover above said recess.

4. A recording apparatus according to claim 1, wherein said recording means records by discharging ink.

5. A recording apparatus according to claim 4, wherein said recording means discharges the ink by utilizing thermal energy.

6. A recording apparatus comprising:

reading means for reading an image on an original;

recording means for performing a recording on a sheet by discharging an ink droplet;

a convey path for guiding the sheet on which the recording was performed by said recording means, said convey path being extended substantially horizontally;

convey means for conveying the sheet on which the image was formed by said recording means along said convey path, said convey means being provided at an end of said convey path on a side of said recording means;

wherein said reading means reads the image while conveying the original in a direction substantially parallel to and opposite to a conveying direction in said convey path;

a discharge tray for stacking originals on which images are read by said reading means; and discharge means for discharging the sheet conveyed through said convey path out of said recording apparatus, said convey path being provided between said recording means and said discharge means;

wherein said convey path and said convey means are provided downstream of said recording means, and said discharge tray is upwardly inclined toward a point above said recording means and provided with an opening member for opening said convey path to permit removal of said recording means when the opening member is opened through a space formed between a part of said convey path located between said convey means and said discharge means, and the opening member.

7. A recording apparatus according to claim 6, wherein said recording means forms an image by discharging ink.

8. A recording apparatus according to claim 7, wherein said recording means discharges the ink by utilizing thermal energy.

9. A recording apparatus according to claim 6, wherein the sheet the image of which was read by said reading means is guided by guide member.

10. A recording and reading apparatus comprising:

containing means for containing sheets;

a first guide member disposed above said containing means for guiding the sheet, said first guide member being extended substantially horizontally;

first convey means for conveying the sheet on which the image was formed by said recording means along said first guide member, said first convey means being provided on said first guide member;

supply means for feeding the sheet contained in said containing means to said first guide member;

recording means for forming an image on the sheet guided by said first guide member by discharging an ink droplet;

discharge means for discharging the sheet guided by said first guide member to a location external to said recording and reading apparatus;

a second guide member disposed above said first guide member for guiding the sheet;

second convey means for conveying the sheet along said second guide member;

reading means for reading an image on the sheet guided by said second guide member; and a discharge tray for stacking originals on which images are read by said reading means, wherein said reading means reads the image while conveying the original along said second guide member in a direction substantially parallel to and opposite to a conveying direction in said first guide member, and said discharge tray is upwardly inclined toward a point above said recording means and provided with an opening member for opening a spacing formed between said first guide member and second guide member to thereby permit a removal of said recording means through the spacing when the opening member is opened.

11. A recording and reading apparatus according to claim 10, wherein said recording means discharges the ink by utilizing thermal energy.

12. A sheet discharge apparatus comprising:

discharge means for discharging a sheet;

an outer cover having a top wall and side walls for covering a body of said sheet discharge apparatus;

reading means for reading an image on an original; and a convey path provided below said reading means and extended substantially horizontally, wherein said reading means reads the image while conveying the original in a direction substantially parallel to and opposite to a conveying direction in said convey path, wherein a recess is formed in a portion of said cover and said discharge means is arranged in an area of said recess, and the sheets are discharged by said discharge means into said recess, and wherein said recess is formed in a side wall of said cover and extends into said sheet discharge apparatus so deeply that a discharged sheet of a minimum length usable with said discharge apparatus and discharged into said recess has a shorter length than the depth of said recess so as to be visible from outside of said sheet discharge apparatus while a discharged sheet of a maximum length usable with said discharge apparatus has such a length that it protrudes from said recess of said outer cover.

13. A sheet discharge apparatus according to claim 12, wherein the sheets discharged by said discharge means are stacked on a bottom surface of said recess.

14. A sheet discharge apparatus according to claim 12, wherein a notch for permitting the visual observation of the sheet discharged on a bottom surface of said recess is formed in said outer cover above said recess.

15. A recording apparatus, comprising:

recording means for forming an image on a sheet; and a sheet discharge apparatus according to claim 12 for discharging a conveyed sheet on which the image was formed by said recording means.

16. A recording apparatus according to claim 15, wherein said reading means arranged in said recess below said outer cover and adapted to read an image on an original.

17. A recording apparatus according to claim 15, wherein said recording means performs the recording by discharging ink.

18. A recording and reading apparatus comprising:

containing means for containing a sheet or sheets;

a first guide member arranged above said containing means and adapted to guide the sheet from said containing means;

supply means for feeding the sheet contained in said containing means to said first guide member;

recording means for forming an image on the sheet guided by said first guide member;

a sheet discharge apparatus according to claim 12 for discharging the sheet on which the image was formed by said recording means; and a second guide member arranged above said first guide member and adapted to guide the original, wherein said reading means reads the image on the original guided by said second guide member.

19. A recording and reading apparatus according to claim 18, wherein said recording means forms the image by discharging ink.

20. A sheet discharge apparatus according to claim 12, wherein a relation $X \leq h/\tan \theta$ is satisfied, when defining a distance between a side wall of said apparatus and a tip end of the discharged sheet of minimum length as X, a depth of said recess (a height between a bottom face and an upper face of said recess) as h, and an angle between a horizontal line extending from the bottom surface of said recess and a line of vision of an operator for observing said apparatus as $\theta$.

21. An apparatus according to claim 20, wherein said relation $X \leq h/\tan \theta$ is satisfied when said angle $\theta$ is selected as $20° \leq \theta \leq 70°$.

* * * * *

UNITED STATES PATENT AND TRADEMARK OFFICE
CERTIFICATE OF CORRECTION

PATENT NO. : 6,102,506

DATED : August 15, 2000

INVENTOR(S): KEIZO SASAI, ET AL.

It is certified that error appears in the above-identified patent and that said Letters Patent is hereby corrected as shown below:

COVER PATE AT ITEM [57] ABSTRACT:
Line 5, "convering" should read --covering--.

COLUMN 4:
Lines 32-33, "without no monitor" should read --without a monitor--; and
Lines 37-38, "are often remained on" should read --often remain on--.

COLUMN 10:
Line 52, "discahrged" should read --discharged--.

COLUMN 12:
Line 25, "form" should read --from--.

UNITED STATES PATENT AND TRADEMARK OFFICE
CERTIFICATE OF CORRECTION

PATENT NO. : 6,102,506

DATED : August 15, 2000

INVENTOR(S): KEIZO SASAI, ET AL.

It is certified that error appears in the above-identified patent and that said Letters Patent is hereby corrected as shown below:

COLUMN 15:
Line 34, "carraige" should read --carriage--; and
Line 49, "electromagnetic" should read --electro-magnetic--.

Signed and Sealed this

Seventeenth Day of April, 2001

NICHOLAS P. GODICI

Attesting Officer      Acting Director of the United States Patent and Trademark Office